(12) United States Patent
Slothouber et al.

(10) Patent No.: US 7,987,182 B2
(45) Date of Patent: Jul. 26, 2011

(54) SYSTEM AND METHOD FOR RECOMMENDING ITEMS OF INTEREST TO A USER

(75) Inventors: Louis P. Slothouber, Leesburg, VA (US); Jeffrey William Johnston, Charlottesville, VA (US)

(73) Assignee: Fourthwall Media, Inc., Sterling, VA (US)

( * ) Notice: Subject to any disclaimer, the term of this patent is extended or adjusted under 35 U.S.C. 154(b) by 631 days.

(21) Appl. No.: 11/465,967

(22) Filed: Aug. 21, 2006

(65) Prior Publication Data

US 2007/0078849 A1    Apr. 5, 2007

Related U.S. Application Data

(60) Provisional application No. 60/709,420, filed on Aug. 19, 2005.

(51) Int. Cl.
*G06F 7/00* (2006.01)
(52) U.S. Cl. .................. 707/722; 707/723
(58) Field of Classification Search ............ 702/19; 707/101; 715/234
See application file for complete search history.

(56) References Cited

U.S. PATENT DOCUMENTS

| 6,029,195 | A | 2/2000 | Herz | |
|---|---|---|---|---|
| 6,567,814 | B1* | 5/2003 | Bankier et al. | 707/101 |
| 6,948,183 | B1* | 9/2005 | Peterka | 725/25 |
| 2003/0074142 | A1* | 4/2003 | Steeg | 702/19 |
| 2008/0133682 | A1* | 6/2008 | Chadwick et al. | 709/206 |
| 2008/0189253 | A1* | 8/2008 | Oliver et al. | 707/3 |
| 2009/0307581 | A1* | 12/2009 | Jaepel et al. | 715/234 |

OTHER PUBLICATIONS

European Patent Office Communication and Supplementary European Search Report mailed Oct. 1, 2010; for International Application No. EP 06801915.7 / PCT/US2006/032446; 6 pages.

* cited by examiner

*Primary Examiner* — Shahid A Alam
*Assistant Examiner* — Donald Lawson
(74) *Attorney, Agent, or Firm* — Hunton & Williams LLP

(57) ABSTRACT

A embodiment is disclosed for learning user interests based on user actions and then applying the learned knowledge to rank, recommend, and/or filter items, such as e-mail spam, based on the level of interest to a user. The embodiment may be used for automated personalized information learning, recommendation, and/or filtering systems in applications such as television programming, web-based auctions, targeted advertising, and electronic mail filtering. The embodiment may be structured to generate item descriptions, learn items of interest, learn terms that effectively describe the items, cluster similar items in a compact data structure, and then use the structure to rank new offerings.

44 Claims, 12 Drawing Sheets

FIGURE 5

| Term # | Term Name | Term Frequency |
|---|---|---|
| 0 | Gsoccer | 230 |
| ... | | |
| 34 | Dron howard | 3 |
| ... | | |
| 687 | Arussell crowe | 38 |
| ... | | |
| 956 | C11837 (ESPN2) | 257 |
| ... | | |

| Term Type | Words or Phrases? | Stop List? | Stem? | MAX Filter | MIN Filter |
|---|---|---|---|---|---|
| G (Sub-genre) | P | | | | |
| T (title) | P | X | X | X | X |
| S (sub-title/ description) | W | X | X | X | X |
| A (actor) | P | | | X | X |
| D (director) | P | | | X | X |
| P (producer) | P | | | X | X |
| W (writer) | P | | | X | X |
| C (channel) | W | | | | |

FIGURE 7

| Term # | Term Frequency | Bit Assignment |
|---|---|---|
| 6 | 3 | - |
| 687 | 26 | 1 |
| 2 | 5 | - |
| 0 | 41 | 3 |
| 85 | 2 | - |
| 956 | 22 | 2 |
| 34 | 19 | 4 |
| 27 | 5 | - |
| ... | | |

FIGURE 8

FIGURE 9(a)
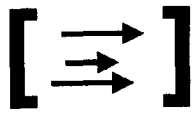
FIGURE 9(b)
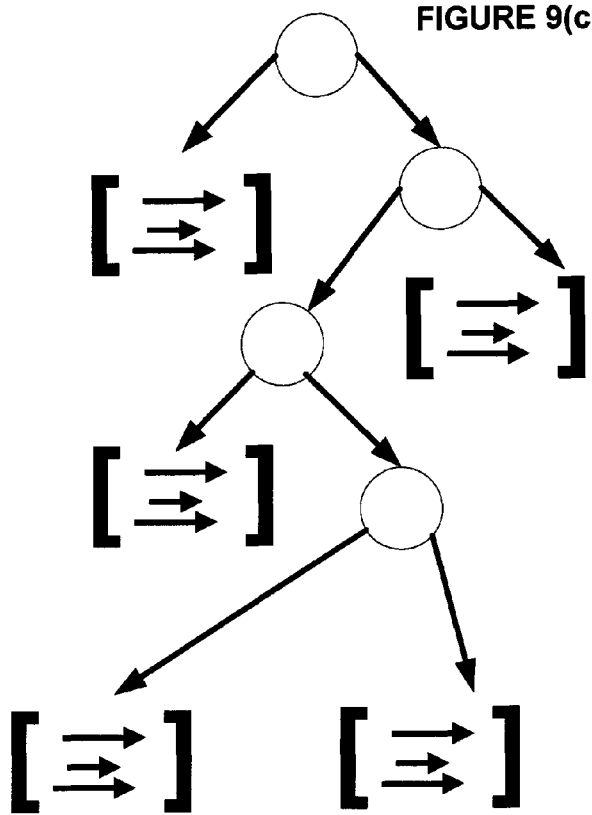
FIGURE 9(c)

1100

SYSTEM AND METHOD FOR RECOMMENDING ITEMS OF INTEREST TO A USER

BACKGROUND OF THE INVENTION

The invention relates to an intelligent technique for learning user interests based on user actions and then applying the learned knowledge to rank, recommend, and/or filter new items based on the level of interest to a user. More particularly the invention relates to an automated, personalized information learning and recommendation engine for a multitude of offerings, such as television programming, web-based auctions, targeted advertising, and electronic mail filtering. The embodiment is structured to generate item descriptions, learn items of interest, learn terms that effectively describe the items, cluster similar items in a compact data structure, and then use the structure to rank new offerings.

DESCRIPTION OF THE PRIOR ART

Recommendation systems are programs which suggest items of potential interest to a person—such as television programs, music, and retail products—given some information about the person's interests.

Often, recommendation systems are implemented using collaborative filtering techniques, where a person's interests are determined (filtered) based on the interests of many other people (by collaboration). Collaborative filtering systems generally operate in two steps: First, identify people who share the same interests as the target user—as indicated by rating patterns or past purchase activity. Then, using the ratings from those like-minded people, recommendations are made to the user. Some shortcomings of naïve collaborative filtering include: inadequate overlap of interests between the user and the group (a.k.a., the "sparsity problem"), ineffective if there is not enough rating or purchase information available for new items, potential privacy concerns of having purchase or preference information stored on third-party servers, and the potential for having recommendations influenced by the artificial inflation or deflation of ratings (spoofing).

Another approach to recommendation systems is content-based. In this approach, the content or other characteristics of the items themselves are used to gage a person's interest in new items. For example, knowledge of genres, artists, actors, directors, writers, MPAA-type ratings, cost, and production date of previously consumed (viewed, purchased, listened to) items is used to predict additional items of interest. These techniques depend on the ratings or past behavior of an individual user—not on the preferences of a group. Shortcomings of this approach can be: need for user to explicitly enter preference/profile information and difficulties in extracting good features for describing items.

Glossary of Terms

Attribute Bit Vector: Is a bit vector containing fixed (pre-defined) attributes describing a particular item.

Binary Attribute Format (BAF): Is a compiled fixed length data structure containing all the information about an item for use by the IPGX Client.

Bit Vector: Is the Attribute Bit Vector and Term Bit Vector taken together, upon which learning, ranking, and filtering decisions are based.

Clickstream: Is a time sequence of channel changes, web site visits, or button clicks made by TV viewers or computer users.

Common (or Canonical) Text Format: Is a text encoding used for collecting key descriptive terms about items before they are compiled into Bit Vectors.

Decision Tree: Is a tree whose internal nodes are tests on input patterns and whose leaf nodes are categories of patterns.

Head End: The distribution system's side of the transmission system where servers and broadcast equipment are located.

Inductive Learning: Is a method of learning from examples.

IPG: Is an Interactive Program Guide, also called EPG (Electronic Program Guide).

IPGX: Is Interactive Program Guide Extensions. Extensions to Interactive Program Guides providing program recommendations to users based on their viewing history. Many variations of IPGX are available according to embodiments of the present invention.

IPGX Client: The IPGX software components residing in the set-top box. Many variations of the IPGX Client are available according to embodiments of the present invention.

IPGX Server: The IPGX software components residing at the distribution system head end. Many variations of the IPGX server are available according to embodiments of the present invention.

Information Retrieval (IR): Is the subfield of computer science that deals with the automated storage and retrieval of documents.

iTV: Is Interactive Television.

MSO (multiple services operator): Is a generic term for the provider of video programs and related services like Video on Demand, Electronic Program Guides, and Internet/Data Services.

Program: Is a unit of video content such as a movie, series episode, advertisement, or sporting event.

Program Data Repository: Where program data is stored on the IPGX Server.

Term Bit Vector: Is a bit vector containing the variable attributes (a.k.a. terms) describing a particular item.

Term Dictionary: Is a table maintained on the Server that keeps track of all variable terms extracted from the various item description sources. The table maps each term to a unique identifier and notes the frequency each term has occurred in the entire item database.

Term Map: Is a list maintained on set-top box or local computer that keeps track of variable attributes terms associated with "liked" items. Used for assigning terms to bits in local Term Bit Vector. Contains Term # (from Server Term Dictionary), Term Frequency (number of time the term has been seen in "liked" items on the Client), and Bit Assignment (which bit in the Term Bit Vector, if any, the term has been assigned to for the particular set-top box or PC).

Vector Space Model: Is a popular technique in IR where documents are represented as vectors of the significant words they contain. Each term in a vector specifies the frequency with which the word appears in the document. Similarities between documents (and between queries expressed as vectors and documents) can be computed using vector math operations.

Viewer: Is a person who views and interacts with programs and other content provided by the distribution system.

VOD: Video-on-demand.

SUMMARY OF THE INVENTION

In an exemplary embodiment of the present invention, a system and method represents an item of interest to a user or group of users. The representation of an item of interest is presented as a vector consisting of N distinct attributes representing content or features of the item. Items of interest can be determined by analyzing the clickstream of remote control actions for television channel changes, or clicks used in choosing auction items from an auction web site via television or the internet. The N distinct attributes are gleaned from descriptive data about each item (encoded in a canonical format). The attributes can be: (a) Predefined for the kind of items being considered, (b) Determined automatically from frequency data, or (c) A combination of both predefined and automatically-defined attributes. In an embodiment, each attribute in the item vector is a binary bit. Each item being learned by the system is assigned a relevance value representing a degree of interest the user has in the item. During a learning process, a binary decision tree is constructed using the Bit Vectors associated with each item being learned. Using an unsupervised learning algorithm, item vectors (a.k.a., examples) are clustered in the leaf nodes of the decision tree, each retaining its corresponding relevance value. The tree may be constrained to a fixed size, thus bounding the processing and memory requirements. To allow continuous learning of examples despite the fixed size, similar examples are merged and older examples forgotten.

To make program or on-line auction item recommendations, the system periodically gathers item information from electronic program guides (EPGs) or auction item descriptions. As in the learning process, each item is represented as a bit vector with bits set to represent the current item. These vectors are passed to the ranking engine component of the system which filters the item through the binary decision tree and finds the cluster of examples most closely matching the new item. The item is then ranked by calculating an interest score for the item that blends the similarity of the item with the examples in the cluster and their associated relevance values. In the electronic program guide embodiment, the Attribute and Term Bits represent information such as title, creation date, writer, director, producer, cast, and genre.

Another embodiment employs a number of clustering decision trees, with each tree representing a demographic group of television viewers. These trees can be used to help determine the makeup of viewers in a given household using the same STB and thus help decide what programming and targeted advertising to recommend at a particular time. From the remote control clickstream data, the embodiment ranks each of the clustering decision trees, accumulates ranking values of each decision tree, and infers the quantity and characteristics of the people who live in a specific household with respect to their age and television viewing habits. The embodiment is implemented to ascertain the demographics of household members from data related to, for example, who is watching what program and at what times of the day on a set-top box. The embodiment predefines a number of clustering decision trees, each of which is associated with a demographic group of interest. From the remote control clickstream data, the embodiment ranks each of the clustering decision trees, accumulates ranking values of each decision tree, and infers the number of individuals and the characteristics of the people who watch television programming, their age and their television viewing habits.

Yet another embodiment of the present invention compares the clustering decision trees generated by different applications, and/or on different set-top-boxes (if there are more than one set-top box) to generate more information about the viewers in one household. The embodiment compares the trees and branches of those trees for similarities and differences using a similarity algorithm. Differences would indicate another viewer who prefers one television unit over another. Similarities at different times indicate a viewer who watches different televisions at different times. This allows us to identify different television sets for the family, the kids, the bedroom, etc. Similarities at overlapping times may indicate multiple viewers in the house with the same interests and demographics. Subtle differences between these similar trees/branches/clusters may define subtle distinctions between similar individuals.

In another embodiment of the present invention, the algorithm is configured for filtering e-mail spam, where a front-end processor is employed to translate each e-mail message to set appropriate bits. Messages that are in a common text format (CTF), and received from an e-mail server are encoded into a binary attribute format (BAF) consisting of a message identifier, relevance (interest score), and attribute bit vector, such as, message date, time, size, header (i.e. from whom the e-mail message is, subject of the message, etc.), and attachments (if any). Based on recipient's interest in the message as determined by clickstream analysis (i.e. opening of the e-mail message, or deletion of the message without opening it), the embodiment determines whether or how to pass the message example to user.

According to another embodiment of the present invention, a system for and method of recommending items to a user is presented. This embodiment includes generating item descriptions and learning the item description of interest to a user. This embodiment further include learning terms effective for representing item descriptions and clustering item descriptions that are similar. This embodiment further includes recommending item descriptions based on the learning steps.

Various optional features of the above embodiment include the following. The item descriptions may constitute television programming data, advertising data, electronic mail, or web-based auction items data. A relevance value of each learned items of interest may be calculated using:

$$\text{Relevance value} = \left(\frac{\text{Time} \cdot \text{spent} \cdot \text{on} \cdot \text{a} \cdot \text{specific} \cdot \text{program}}{\text{Total} \cdot \text{time}}\right) \times \text{Maximum} \cdot \text{relevance} \cdot \text{value}$$

The highest relevance value may be set to 127.

BRIEF DESCRIPTION OF THE DRAWINGS

FIG. 5. is a table illustrating an example bit vector (for the movie A Beautiful Mind) according to an embodiment of the present invention.

FIG. 6. is a table illustrating an example of a term dictionary according to an embodiment of the present invention.

FIG. 7. is a table illustrating the processing that occurs for different term types according to an embodiment of the present invention.

FIG. 8. is a table illustrating an example of a term map according to an embodiment of the present invention.

FIG. 9(a), FIG. 9(b), FIG. 9(c), and FIG. 9(d) illustrate examples of generic binary decision trees in various stages of maturity according to an embodiment of the present invention.

DETAILED DESCRIPTION

The following description is intended to convey an understanding of the invention by providing a number of specific embodiments and details involving various applications of the invention. It is understood, however, that the invention is not limited to these embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The following discussion considers in detail potential applications for embodiments of the present invention, including, by way of non-limiting example: providing greater personalization in the areas of TV programming, TV-based advertising, and email filtering.

In the past, television viewers identified television programs of interest using printed television program guides. Typically, such guides contained grids listing the available television programs by time, date, channel and title. As the number of television content providers increased, so did the number of programs available to viewers. In some parts of the world broadcast channels alone number in the hundreds. Along with the availability of pay-per-view channels and video-on-demand, the ability for viewers to effectively identify desirable television programs using such printed guides has become impractical.

More recently, television program guides have become available in electronic format, often referred to as electronic program guides (EPGs). An EPG is an application used with Digital Video Recorders, set-top Cable and Satellite boxes, and newer TVs to list current and scheduled programs that are or will be available on each channel. In addition, IPTV (Internet Protocol television) is another method of distributing television content to consumers. IPTV is delivered over internet protocol, and it uses a two-way broadcast signal sent through the provider's backbone network and servers, to allow viewers to select content on demand, and take advantage of other interactive TV options. In IPTV, a portal includes an EPG-type functionality that requires a source of schedule data. This can be taken from an external source or from the schedule data in the incoming streams. EPGs display a fragment of the available broadcast content in grids listing the available television programs by time and date, channel and title—much like their paper counterparts. Some also provide search functionality that allows viewers to find programs by actors, keywords, and other criteria.

Figure 1:
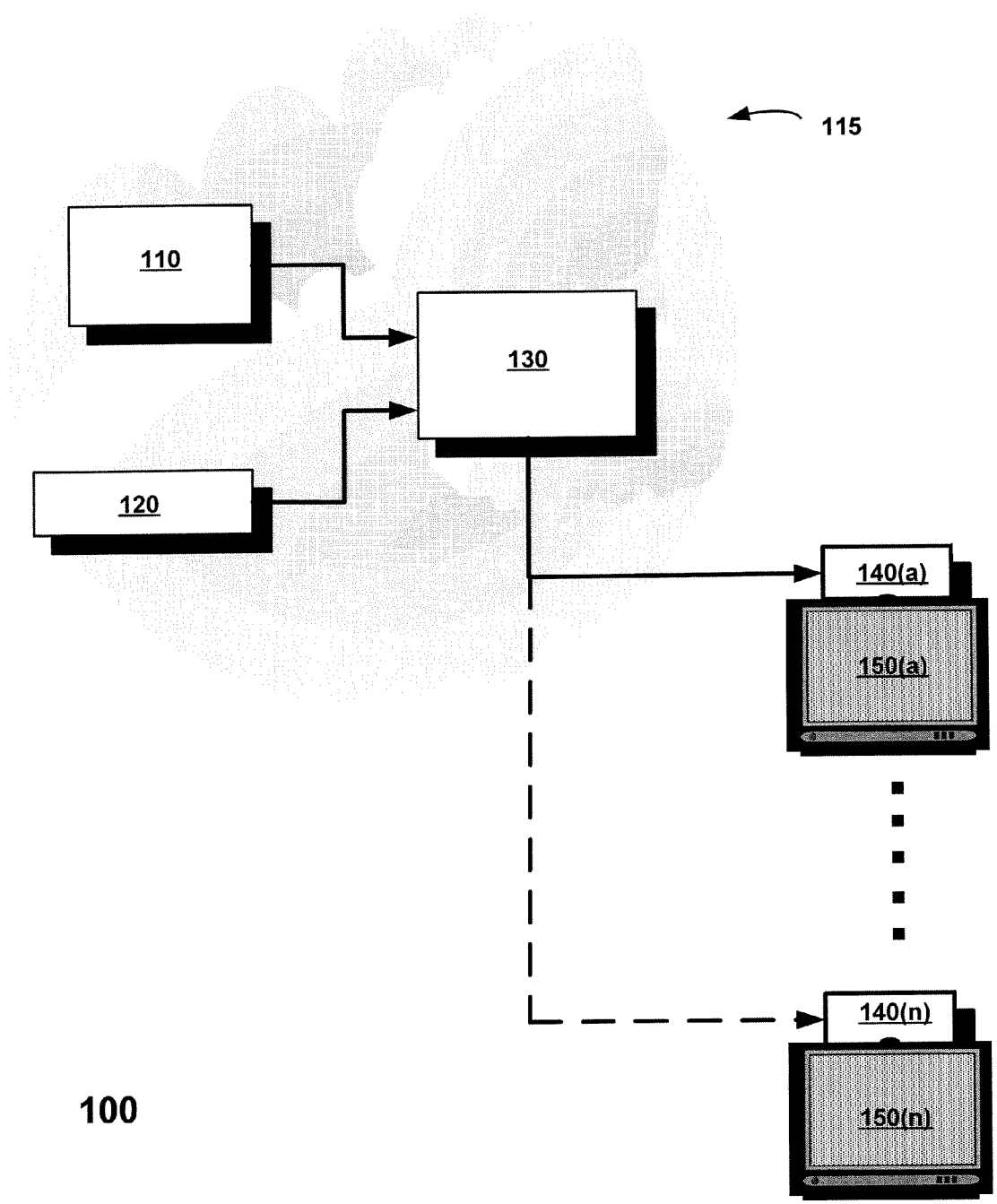
FIG. 1. is a prior art block diagram illustrating a multimedia content delivery system.

Referring now to FIG. 1, there is shown a system 100 for delivering television and other multi-media programs to a plurality of customer premises. In one implementation, the system 100 relies on a broadband communications network 115, such as a cable network. However, other networks are contemplated, one particular example of which is a satellite network.

In one configuration, the system 100 includes a plurality of set-top boxes (STBs) 140(a)-140(n) located, for instance, at customer premises. Generally, an STB 140 is a consumer electronics device that serves as a gateway between customer's televisions 150(a)-150(n) and the network 115. Alternatively, STBs 140(a)-140(n) may be embodied more generally as a "Home Multimedia Platform" or an "Internet Protocol Set-Top Box", signifying that STBs are becoming aligned with home broadband connectivity, such as wired or wireless LANs.

As shown in FIG. 1, an STB 140 receives Quadrature Amplitude Modulation (QAM) encoded television signals and other information from network 115, that may consist for example, of a source of digital television programming 110 that transmits signals encoded in a format such as MPEG-2 (Moving Picture Experts Group) into a cable head-end facility 130. In addition, the cable head-end facility receives electronic program guides (EPGs) from one or more listings service 120, such as Zap2It™, SARA™ (Scientific Atlanta Resident Application), and video-on-demand (VOD) catalogs, among others. The cable head-end facility transmits the MPEG-2 encoded signals along with the EPG to individual STBs to be displayed on individual television, or other display units.

EPGs may be improved according to certain embodiments of the present invention so as to enhances the ability of viewers to more quickly and easily identify programs of interest. For example, many viewers have preferences toward, or biases against, certain categories of programming, such as action-based programs or sports programming. By applying these viewer preferences to the EPG, programs of interest to a particular viewer can more effectively be found.

To address the limitations of EPGs, systems capable of making video programming recommendations are being developed. Some, like those offered by NetFlix, TiVo, and MovieLens are based primarily on collaborative filtering. Others, such as that described in U.S. Pat. No. 6,727,914 to Gutta, take a content-based approach. Combined aspects of collaborative filtering, content-based recommenders, and explicit feedback may be used to provide better solutions. To minimize the need for viewers to explicitly enter information about themselves, some systems keep track of the channels the viewers watch (or buttons they push) to attempt to learn viewers' interests in the background (a.k.a., "clickstreaming"). Many of these systems go a long way toward improving viewers' abilities to find programs of interest. Many, however, still suffer from some of the shortcomings of collaborative filtering and content-based approaches mentioned above.

In the field of television-based advertising, currently commercials aired during a program are those expected to appeal to the people that watch the program. This type of demographic targeting is coarse grained. It is well known that only a small fraction of viewers find the commercials of interest. More often, the viewer switches channels or walks away from the set. Methods are being developed to deliver advertisements on a more personalized basis. These methods leverage the collaborative filtering, content-based, and clickstream techniques discussed earlier and promise to better match product and service providers with interested customers. Methods that require the least effort by viewers, most closely match their current interests, and respect their privacy rights and expectations will generally be most successful.

With the pervasive acceptance of email comes the explosion of unwanted mass emailing (a.k.a., "spam"). Filtering techniques have been invented to stem the flood of spam, such as: local blacklisting where a system administrator maintains a list of spammers' IP addresses and blocks email from those addresses; distributed blacklists where web sites share blacklists; whitelisting that creates a list of accepted e-mailers and allows email only from senders on that list (cuts off email from legitimate senders that are not on the list); Bayesian filtering that scores words associated with spam and analyzes new messages based on the score. Other ways of filtering spam include: accepting only mail with a trusted key (may also remove non-spam emails that do not have an associated key); a greylist technique where a mail server refuses new messages with a temporary error and remembers the delivery attempt for the recipient email address, source email address, and source IP (may also refuse authentic messages until some time has elapsed since the first attempt, which introduces some delay on legitimate mail delivery). In turn, spammers are finding new ways to work around these protections. It would be beneficial to have more robust systems and methods for filtering unwanted electronic mail.

Embodiments of the present invention typically employ a primarily content-based approach that employs inductive learning techniques to learn user likes and dislikes in a way that is efficient in terms of processing time and memory space, requires no extra input from users, and avoids some of the other drawbacks of collaborative filtering and content-based recommendation systems mentioned earlier. Among its various applications, it can be used to make TV recommendations, product/service recommendations, and filter unwanted email.

Certain embodiments of the present invention leverage techniques from the fields of artificial intelligence and information retrieval—most notably inductive learning and vector space modeling.

A wide variety of embodiments are referred to as IPGX, for Interactive Program Guide extensions. It extends an EPG to provide multimedia program recommendations to viewers.

Figure 3:
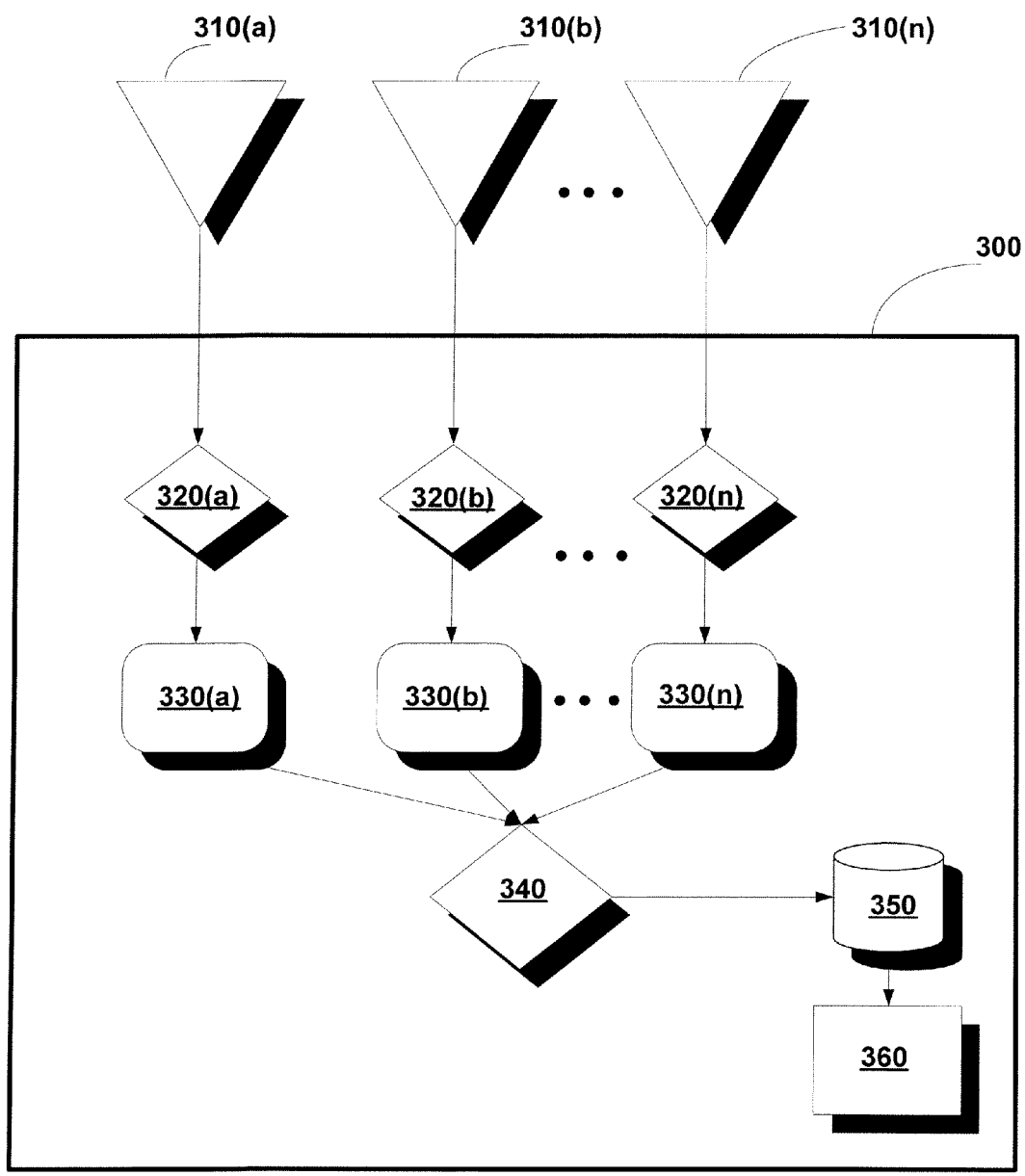
FIG. 3. is a block diagram illustrating interactive programming guide extension server elements and associated guide data sources according to an embodiment of the present invention.

In an IPGX embodiment, each program available from a distribution system is encoded by a Translator module 340 on the IPGX Server embodiment (FIG. 3) into a Binary Attribute Format (BAF) consisting of the following fields: Program Identifier, Instance Identifier Addendum, Relevance, Attribute Bit Vector, Term Bit Vector, Term Count, and Term List. For details about each of these segments, see Appendix B.

Pertinent to the operation of IPGX embodiments are the Relevance, Attribute Bit Vector, Term Bit Vector, Term Count, and Term List segments.

Relevance is an integer ranging from 0 to 255 quantifying the viewer's interest in a particular program. Its value is set by the IPGX Client embodiment (FIG. 4) based on viewer interest in the program as determined by clickstream analysis. Relevance values are stored and normalized (Integer/256) in an IPGX Preferences Tree.

The information encoded in the Attribute and Term Bit Vectors is compiled from a Common Text Format made up of program information extracted from sources such as Zapit™ 310(a), Yahoo™, SARA™ (Scientific Atlanta Resident Application) 310(b), and VOD catalogs 310(n). The Bit Vectors are used to drive the learning and ranking functions of a given IPGX embodiment.

The Attribute Bit Vector is a 64-bit structure with bits representing the fixed attributes defined in the Common Text Format. These are attributes like program air time, program cost, run time, age suitability, quality ratings, production year, MPAA-type ratings, content advisories, program type, and program genre.

The Term Bit Vector is a 64-bit structure with bits representing the variable attributes defined in the Common Text Format. These include program title, subtitle, description, actors, writers, directors, producers, sub-genres, and channel name. Variable attributes range over an unlimited set of terms that change over time as new actors, writers, directors, and producers gain prominence; new channels come on line; and new titles are released. This vector also accommodates words extracted from program descriptions.

The Term Count and Term List are used by the IPGX Client when assigning terms to bits in the Term Bit Vector.

Figure 2:
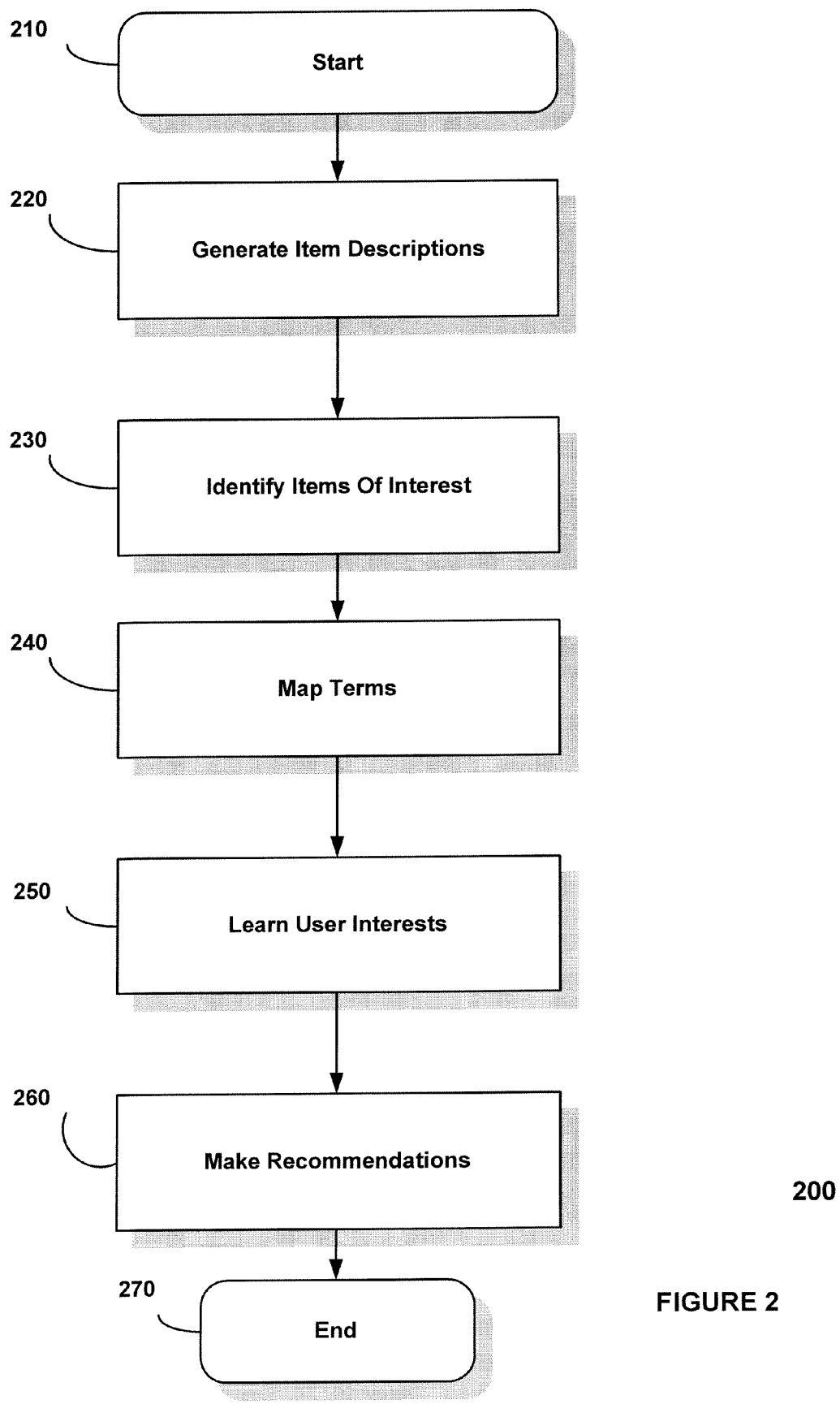
FIG. 2. is a flowchart illustrating the steps of recommending an item to a user according an embodiment of the present invention.

The flow of the overall IPGX process of an exemplary embodiment is shown in FIG. 2. The illustrated steps are accomplished by the IPGX Server and IPGX Client exemplary embodiments depicted in FIGS. 3 and 4 respectively.

Figure 4:
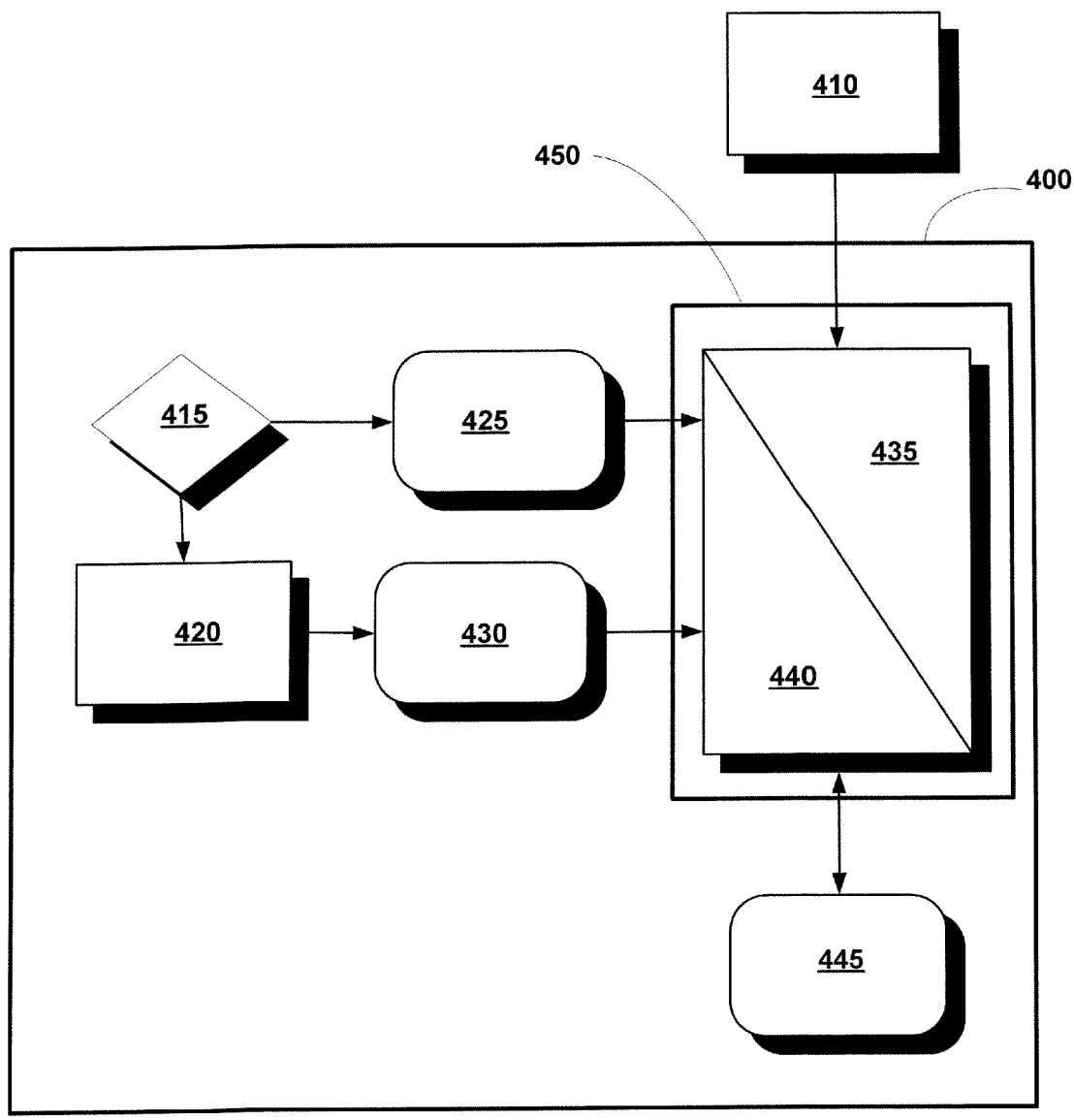
FIG. 4. is a block diagram illustrating interactive programming guide extension client module interfacing with conventional IPG or PVR according to an embodiment of the present invention.

In step 220, item descriptions are generated by IPGX Server processes (FIG. 3), each item description corresponding to a distinct program represented by a distinct BAF element. (In the IPGX embodiment, items are multimedia content like television programs, movies, VOD programs, and Pay-Per-View offerings.) The processes associated with step 220 include, by way of non-limiting example: retrieval of raw program descriptions 320(a), 320(b), . . . 320(n) from sources such as Zap2it™ SARA™ and VOD catalogs 310(a), 310(b), . . . 310(n), conversion of the raw descriptions to a Common Text Format 330(a), 330(b), . . . 330(n), conversion from the Common Text Format to the Binary Attribute Format (340), maintenance of extracted terms in a Term Dictionary (FIG. 6) which is stored in the program data repository 350, a reliable and easily programmable database, such as MySQL, a multithreaded, multi-users, structured query language relational database that runs on operating systems such as Windows™, Linux™ and others. Program data repository 350, is configured to contain two types of records, program information in attribute format received from the program data translator module 340, to be read by a program data broadcaster 360, and term mappings that are numerical identifications assigned to the terms that are read and modified by the program data translator. Program data broadcaster 360 maintains contents of an in-band data carousel that contains all program information for current and future segments, such inband carousel may be a Scientific-Atlanta broadcast file system (BFS) that enables its content to be played out to a set-top box, or it may be a proprietary customized data carousel. At any time, all programs that are available to subscribers, including video-on-demand programming as well as external programming are defined in the in-band data carousel for current and certain number of future segments of programs. Program data broadcaster 360 fetches all program descriptions for on-demand programming with constant instance identifiers, such as video-on-demand, rentals, etc., and generates appropriate instance identifiers; airing date and time related attribute bits in the program description, and finally, transmission of the BAF data describing available programs to the IPGX Client embodiment (FIG. 4).

Once received by the IPGX Client, programs of interest are learned 230 using a Viewer History Collector module 420. An embodiment of this component and step uses a clickstream algorithm as described in Appendix A to accomplish this learning. The clickstream algorithm assigns Relevance values (a.k.a. interest scores) ascribing viewer interest to programs by analyzing clicks of the TV remote control. Based on the Relevance value, the IPGX Client software determines whether or not to pass the program example to an IPGX Learning engine 440 to be learned. (In this embodiment, only "liked" programs exceeding a certain relevance threshold are learned.) Each program example consists of an appropriately-set Attribute Bit Vector (64 bits) and its associated Relevance value. In step 230, the embodiment of the present invention is configured to learn the programs that a viewer likes best.

In the next step 240, the IPGX Learning engine embodiment 440 is configured to learn the variable terms (FIG. 5, t1-t64) that are most useful for describing programs of interest. To do this, the Learning engine tracks the number of times it encounters particular terms associated with programs of interest and, when a threshold is reached, it adds the term to the Term Bit Vector for that set-top box.

Terms are added sparingly to assure they represent strong viewer preferences and to make best use of the limited number of available bits. This step 240 attempts to learn what content (actors, channels, directors, title words, etc.) the viewer likes best. Once this step is done, a complete bit vector representing a program of interest (with its associated relevance value) is ready to be assigned to an appropriate cluster.

In step 250, the system clusters the program examples for comparison against programs of potential future interest. This is accomplished using a binary decision tree (an IPGX Preferences Tree embodiment) which is built on the fly from examples using the complete Bit Vectors generated in the previous step. The nodes of the tree correspond to decision logic that decides which node to route a given example to next based on the values of bits in the Bit Vector—one bit decision per node. Tree leaves store example vectors and their associated relevance values. Leaf nodes are split into new leaf nodes and the tree is reorganized as needed. The clusters are groups of "liked" programs that have similar attributes as computed by the decision tree logic.

Finally in step 260, new programs represented as Bit Vectors are passed to the IPGX Ranking engine embodiment 435 in order to assess their potential interest to the viewer. Using the IPGX Preferences Tree, a candidate program is filtered into the cluster containing the most similar examples and a score is generated for ranking the candidate program against other programs. The scores are a measure of similarity between the candidate program and the example programs in that cluster combined with the Relevance values of those example programs. Candidate programs that are most similar to the most relevant examples receive the highest scores.

Feedback about the quality of clusters and program recommendations can be used to modify which attributes are used and what clusters are formed.

The methods of Information Retrieval and Machine Learning used in certain embodiments have many characteristics in common—making them very compatible and powerful when used in combination. These characteristics include, by way of non-limiting example:

- Representation of content as vectors of descriptive terms (a.k.a. features or attributes)
- Both support similarity calculations between elements; in the IPGX embodiment, compared elements are examples of "liked" programs (when learning) and new programs (when ranking)
- Similarity calculations provide "closeness" values suitable for ranking results
- Both fields offer techniques for clustering similar content that are relatively immune to noise and efficient in terms of computation and storage
- The vector space model and decision tree techniques are relatively simple and transparent, thus facilitating analysis and validation Techniques Specific to Information Retrieval Leveraged in this Embodiment Include:

- Stemming and stop-listing of descriptive text for constructing the term names included in the Term Dictionary
- Frequency counts of variable terms are maintained on the Server (Term Dictionary) and Client (Term Map) for deciding which terms are significant—that is, best candidates for use as attributes
- Middle frequency terms are generally chosen as attributes having most value in identifying content of interest In the Machine Learning domain, an IPGX embodiment uses binary decision trees to cluster program examples. It builds trees incrementally using an unsupervised learning technique.

Some unique aspects of this embodiment include, by way of non-limiting example:

- Use of the above techniques in combination
- Use of the above techniques in an iTV recommendation/personalization system
- An "edge" (thick client) orientation where certain data structures and most of the processing are localized to the set-top box rather than the distribution system head end
- Ability to learn content attributes automatically, on-the-fly
- User preferences reside on the set-top in opaque data structures and are not easily traceable to individual viewer, thereby facilitating privacy.

The following paragraphs discuss the main data structures in a typical IPGX embodiment: Attribute and Term Bit Vectors, Term Dictionary, Term Map, and Decision Trees.

Attribute and Term Bit Vectors are used to represent programs in a way suitable for building decision trees and calculating similarity between programs. These vectors consist of bits representing various program features and content. IPGX embodiments typically use binary values for each element in these vectors (thus the name Bit Vectors). Boolean bits, in lieu of integers, strings, or other data types, are well suited to the set-top environment and provide good overall performance.

The more representative these features are of programs, the better the clustering, ranking, and overall system performance.

The complete Bit Vector can be represented as follows:
($a_1$ $a_2$ $a_3$ ... $a_{64}$ $t_1$ $t_2$ $t_3$ ... $t_{64}$)
where
$a_1$ ... $a_{64}$ represent the 64 fixed attribute bits (Attribute Bits), by way of non-limiting example:

$a_1$=SCHED_WEEKDAY
$a_2$=SCHED_SCHOOLNIGHT
$a_3$=SCHED_DAYTIME
$a_4$=SCHED_AFTERSCHOOL
$a_5$=SCHED_PRIMETIME
$a_6$=SCHED_LATENIGHT
$a_7$=COST_FREE
$a_8$=COST_EXPENSIVE
$a_9$=RUNNINGTIME_SHORT
$a_{10}$=RUNNINGTIME_MEDIUM
$a_{11}$=RUNNINGTIME_LONG
$a_{12}$=AGE_KIDS
$a_{13}$=AGE_TEENS
$a_{14}$=AGE_ADULT
$a_{15}$=QUALITY_STINKS
$a_{16}$=QUALITY_WATCHABLE
$a_{17}$=QUALITY_WONDERFUL
$a_{18}$=COLOR
$a_{19}$=YEAR_OLD
$a_{20}$=YEAR_DATED
$a_{21}$=YEAR_MODERN
$a_{22}$=YEAR_CURRENT
$a_{23}$=ADVISORY_NUDITY
$a_{24}$=ADVISORY_SEX
$a_{25}$=ADVISORY_VIOLENCE
$a_{26}$=ADVISORY_LANGUAGE
$a_{27}$=TYPE_SERIES
$a_{28}$=TYPE_SPECIAL
$a_{29}$=TYPE_SPORTS
$a_{30}$=TYPE_MOVIE
$a_{31}$=TYPE_NEWS
$a_{32}$=TYPE_TALK
$a_{33}$=TYPE_PAID
$a_{34}$=TYPE_OTHERTYPE
$a_{35}$=GENRE_DRAMA
$a_{36}$=GENRE_ACTION
$a_{37}$=GENRE_WESTERN
$a_{38}$=GENRE_SCIFI_FANTASY
$a_{39}$=GENRE_COMEDY
$a_{40}$=GENRE_MUSICAL
$a_{41}$=GENRE_MYSTERY
$a_{42}$=GENRE_THRILLER
$a_{43}$=GENRE_ADVENTURE
$a_{44}$=GENRE_HORROR
$a_{45}$=GENRE_ROMANCE
$a_{46}$=GENRE_FAMILY
$a_{47}$=GENRE_ANIMATION
$a_{48}$=GENRE_CHILDREN
$a_{49}$=GENRE_OTHERGENRE
$a_{50}$=reserved
$a_{51}$=reserved
$a_{52}$=reserved
$a_{53}$=reserved
$a_{54}$=reserved
$a_{55}$=reserved
$a_{56}$=reserved
$a_{57}$=reserved
$a_{58}$=reserved
$a_{59}$=reserved a60=reserved
a61=reserved
a62=reserved
a63=reserved
a64=reserved If the attribute equals "1," that attribute is true for the current program. If "0," the attribute is false for the current program.

As described in Appendix B, fixed attributes in many cases have been consolidated from source attributes spanning continuous ranges or a large number of choices. (This is sometimes called "dimensionality reduction.") For example, program production years (YEAR) have been translated into four date ranges: OLD, DATED, MODERN, and CURRENT; and program genres (GENRE) have been consolidated into 15 genres deemed most significant. This has two benefits: (1) It allows simpler and faster bit operations on the data, and (2) It avoids over-constraining (over fitting) the data for classification and ranking. t1 . . . t64 represent the 64 variable attribute bits (Term Bits)

Term bits are defined uniquely for each set-top box based on the frequency the terms appear in the descriptions of watched programs. (These are the terms contained in the Term List of the BAFs sent from the IPGX Server embodiment.) They are maintained in a Term Dictionary on the Server and tracked on the set-top using a Term Map. The Term Map maps the "most important" terms (those having a relatively large amount of statistically significant correlation to programs of interest) to bits in the Term Bit Vector.

For example, given the term map shown in FIG. 8, bit definitions for a hypothetical set-top box would be:
t1=687 (ID representing Arussell crowe)
t2=956 (ID representing C11837, Channel=ESPN2)
t3=0 (ID representing Gsoccer)
t4=34 (ID representing Dron howard)
t5-t64=Unassigned These bits indicate preferences for programs featuring Russell Crowe as an actor, broadcast on ESPN2, falling into the subgenre Soccer, and directed by Ron Howard. Note that terms used on the Client are encoded as an identification number. These IDs are defined by the Server and mapped to underlying strings in the Term Dictionary.

Figure 5:
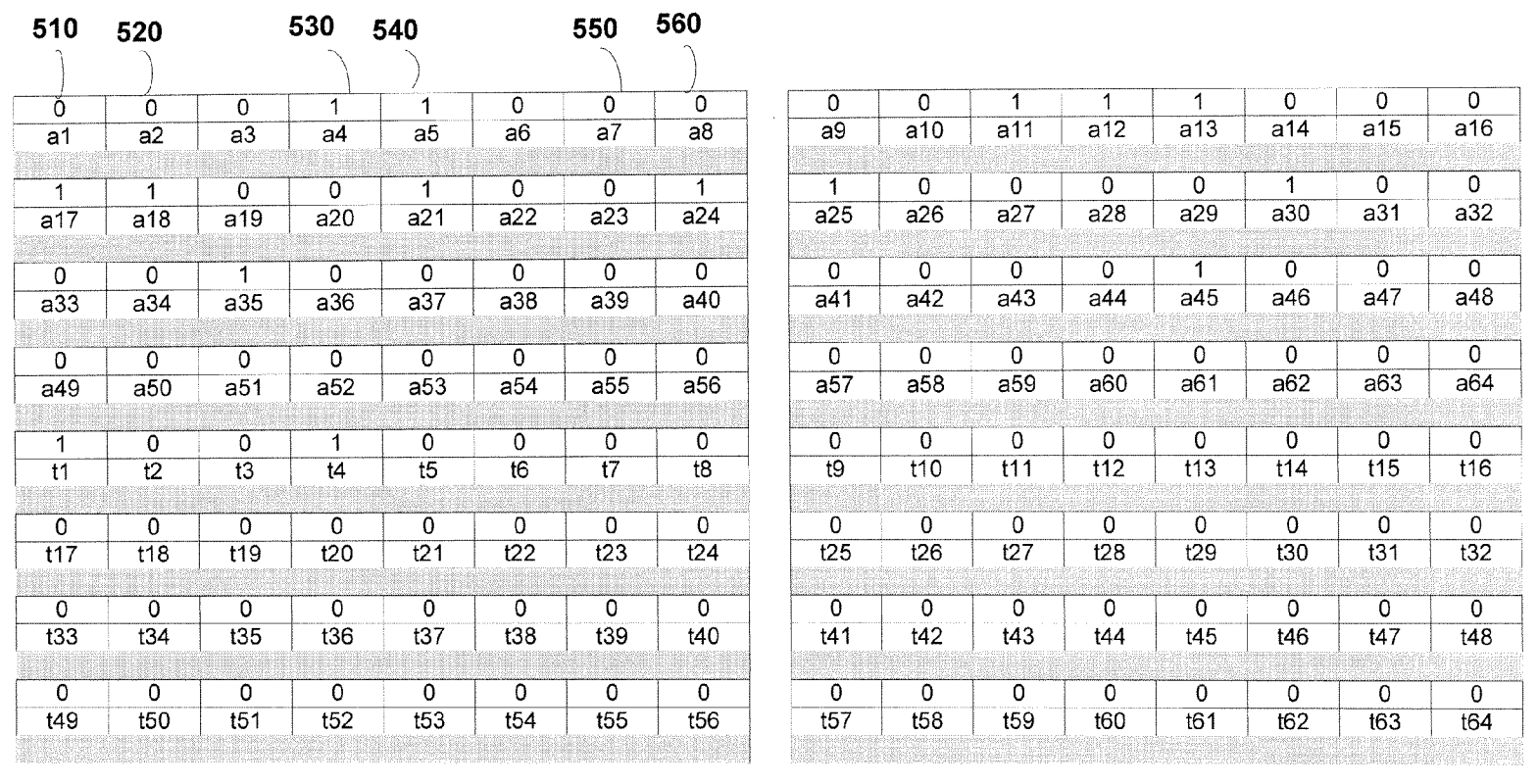

FIG. 5 shows a complete sample Bit Vector for the 2001 movie A Beautiful Mind.

This vector indicates the following about this movie:
Program was watched on Saturday evening (since SCHED_WEEKDAY and SCHED_SCHOOLNIGHT are not set (implies Saturday), and SCHED_AFTERSCHOOL and SCHED_PRIMETIME are set (implies Evening))
Cost to view was between $0 and $5 (since neither COST bit is set)
Running time was >120 minutes (RUNNINGTIME_LONG; actual=135 min.)
Rating was PG-13 (since AGE_KIDS and AGE_TEENS both set, indicating rating was between G and R)
QUALITY rated as WONDERFUL (based on critic reviews)
A COLOR film
Production year was between 1990 and last year (YEAR_MODERN; actual 2001)
Advisories noted for Sex and Violence (since these terms parsed from MPAA description field)
TYPE is MOVIE
GENREs are DRAMA and ROMANCE
Russell Crowe featured as actor and Ron Howard director (corresponding to term bits t1 and t4; both of which have been assigned in the set-top term map)
(To further understand the above bullets, see the bit definitions provided in Appendix B.)

It is worth noting additional variable terms (up to 64) were likely sent to the set-top as being relevant to this movie, such as "Aed harris," "Ajennifer connelly," "Achristopher plummer," "Ajosh lucas," "Tbeautiful," "Tmind," "Sbrilliant," "Sasocial," "Smathematician," "Scryptography," "Snightmare." However, since none of these terms corresponded to bits assigned in the Term Map, they were not assigned in the Term Bit Vector and thus not used for learning or ranking.

In another embodiment, no fixed Attribute Bits are used. Instead, all attributes are Term Bits and they are dynamically adopted for use in Bit Vectors based on their correlation significance to program examples on a given set-top box.

All programs are represented by vectors using these attributes with bits set as appropriate for the particular program.

On the IPGX Server embodiment, a dictionary is maintained to keep track of the terms extracted from the program descriptions. These are the terms used to populate the Term Bit Vectors. The dictionary contains term names, a count of the number of times each term appears in all program descriptions (term frequency), and a global ID used to refer to the term on set-top boxes (term #).

Term names are prepended to unique characters to designate the type of term. As described in Appendix B, current types are G (Sub-Genre), T (Title), S (Subtitle and descriptive words), A (Actor/Cast Member), D (Director), P (Producer), W (Writer), and C (Channel). These classifications denote the meaning of the terms.

The following lists give examples of the types of terms stored in the Term Dictionary.
Sub-Genres:
Gsoccer
Gcurling
Gmusical comedy
Gsitcom
Gsuspense
Titles:
Tgladiator
Tseinfeld
Twide world of sports
Tthe sopranos
T60 minutes
Tthe sound of music
Subtitles and Descriptive Words:
Swashington
Sredskins
Svs
Sdallas
Scowboys
Scycling
Scryptography
Sbeautiful
Smind
Sjerry
Spuffy
Sconvince
Spirate
Sshirt
Actors:
Adanny devito
Aron howard
Ajerry seinfeld
Ahelen hunt
Aclint eastwood
Ajames earl jones
Ajulie andrews
Directors:
Dridley scott
Dron howard
Dsteven spielberg Dgeorge lucas
Drobert wise
Producers:
Pron howard
Pmichael crichton
Pmatt groening
Writers:
Wgeorge lucas
Wlarry david
Wj w johnston
Channel Instances:
C11837 (e.g., channel code for ESPN2)
C33104
C33987

FIG. 6 shows an example of the Term Dictionary. In this example, only terms having appropriate frequencies (see FIG. 7) are assigned Term #s (a.k.a. Global IDs) and are thus eligible to be used in learning and ranking.

The current data type of Term # is an unsigned 16-bit integer. Therefore, 65,536 terms may be assigned.

Terms are processed differently depending on term type, FIG. 7 summarizes the relevant processing for each. "X" indicates "Yes." Lack of entry indicates "No."

MAX Filter and MIN Filter indicate cutoffs for terms having frequencies above or below given thresholds. Only those terms with frequencies within range are assigned Term #s to be included in the BAFs and sent to the Client to be learned or ranked. Additional filtering takes place on the Client in determining what terms are included in the Term Bit Vector.

The mapping of terms to bits in the Term Bit Vector is accomplished using a set-top Term Map. This structure keeps track of terms associated with programs of interest as seen in BAF Term Lists sent to the set top.

As shown in FIG. 8, this map generally includes the global term ID (Term #) assigned by the Server that uniquely identifies the term (corresponds to term strings stored in the Term Dictionary on the server), Term Frequency (number of times the term has been seen in watched programs submitted to the IPGX Learning engine embodiment), and a Bit Assignment (which bit, if any, the term has been assigned in the Term Bit Vector for this set-top box).

Referring back to FIG. 6, in the above example we note four bits have been assigned to the Term Bit Vector for this set-top box. They are:

Bit 1=Term #687, corresponding to Russell Crowe as cast member

Bit 2=Term #956, corresponding to Channel C11837 (ESPN2)

Bit 3=Term #0, corresponding to the Sub-genre of Soccer

Bit 4=Term #34, corresponding to Ron Howard as director

Each of these terms has been encountered enough times in BAF program streams to merit assignment as term bits. They are thus used to learn and rank programs for this set-top box.

A decision tree provides the core of a typical IPGX preferences structure. It currently takes the form of a univariate binary tree. Such trees can be characterized recursively as follows:

Are comprised of a single leaf node or a binary subtree.

A binary subtree consists of a decision node with exactly two sub-nodes, where each sub-node can be either another binary subtree or a leaf node.

Each decision node tests a single Boolean attribute to determine which node is visited next en route to the appropriate leaf node.

Leaf nodes are terminal nodes containing up to, e.g., 16 example program vectors, each with their associated Relevance value.

Figure 9D:
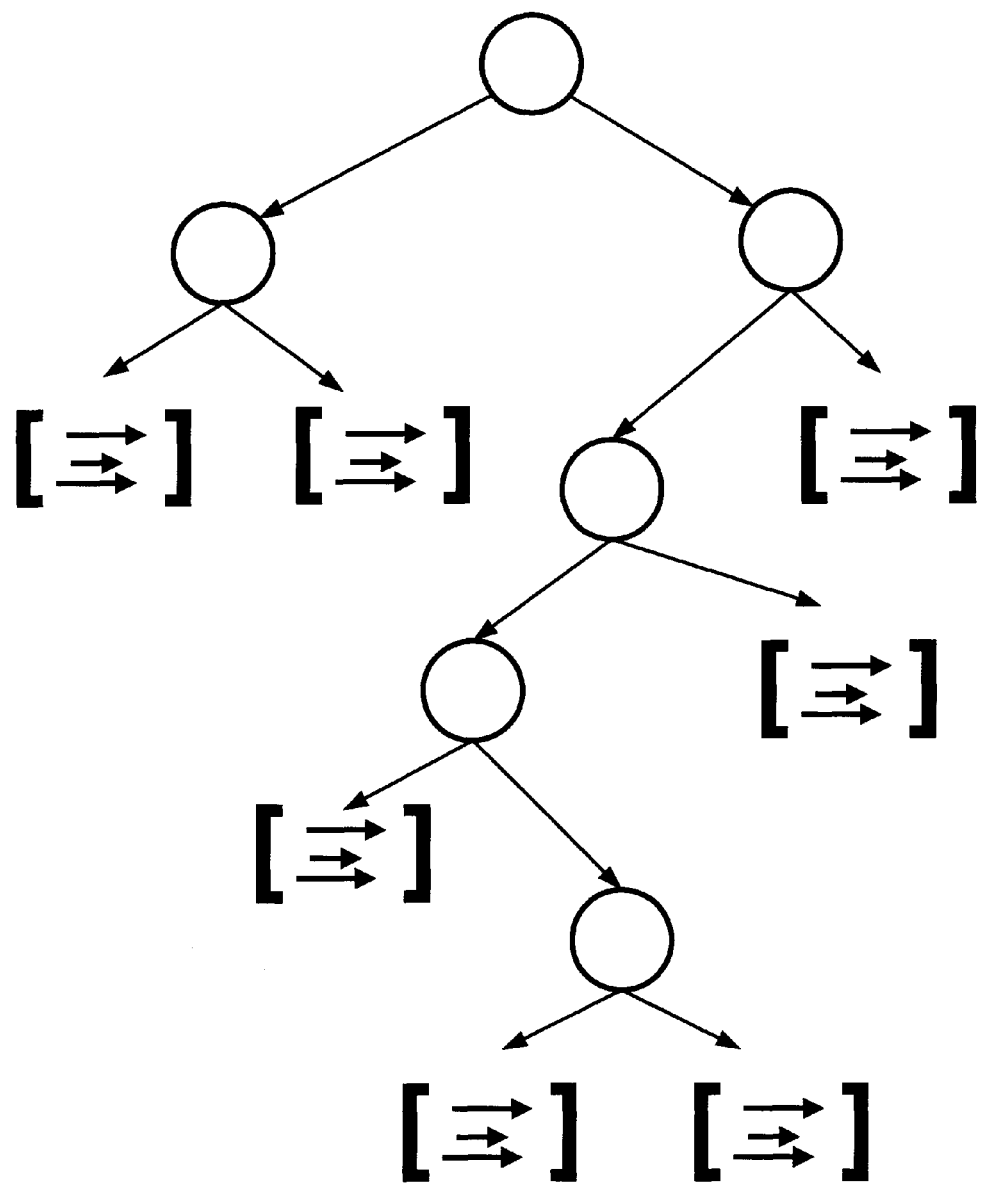

FIG. 9(*a*), FIG. 9(*b*), FIG. 9(*c*), and FIG. 9(*d*) show examples of generic binary decision trees. The first example FIG. 9(*a*) is the special case where the tree consists of a single leaf containing a number of example vectors (the start-up case). The other examples FIG. 9(*b*), FIG. 9(*c*), and FIG. 9(*d*) depict more mature binary trees.

The IPGX decision tree embodiment encodes the viewing history of a set-top box using the bits provided in the Attribute and Term Bit Vectors. In one embodiment, only "liked" programs are learned in the tree. The degree each program was liked is encoded in the Relevance value for that program. That information is stored with the program vectors in the leaf nodes.

IPGX tree embodiments are built incrementally from example program vectors, automatically clustering similar programs into leaf nodes.

The example vectors stored in the leaf nodes are kept in chronological order to facilitate merging or replacement operations when the leaf is "full." The similar examples get merged or the oldest examples replaced.

When used for ranking, candidate program vectors are submitted to the tree, a similar cluster found, and a ranking score computed using the similarity of the candidate vector to the other vectors in the cluster while factoring in the associated Relevance values of the examples.

Figure 10:
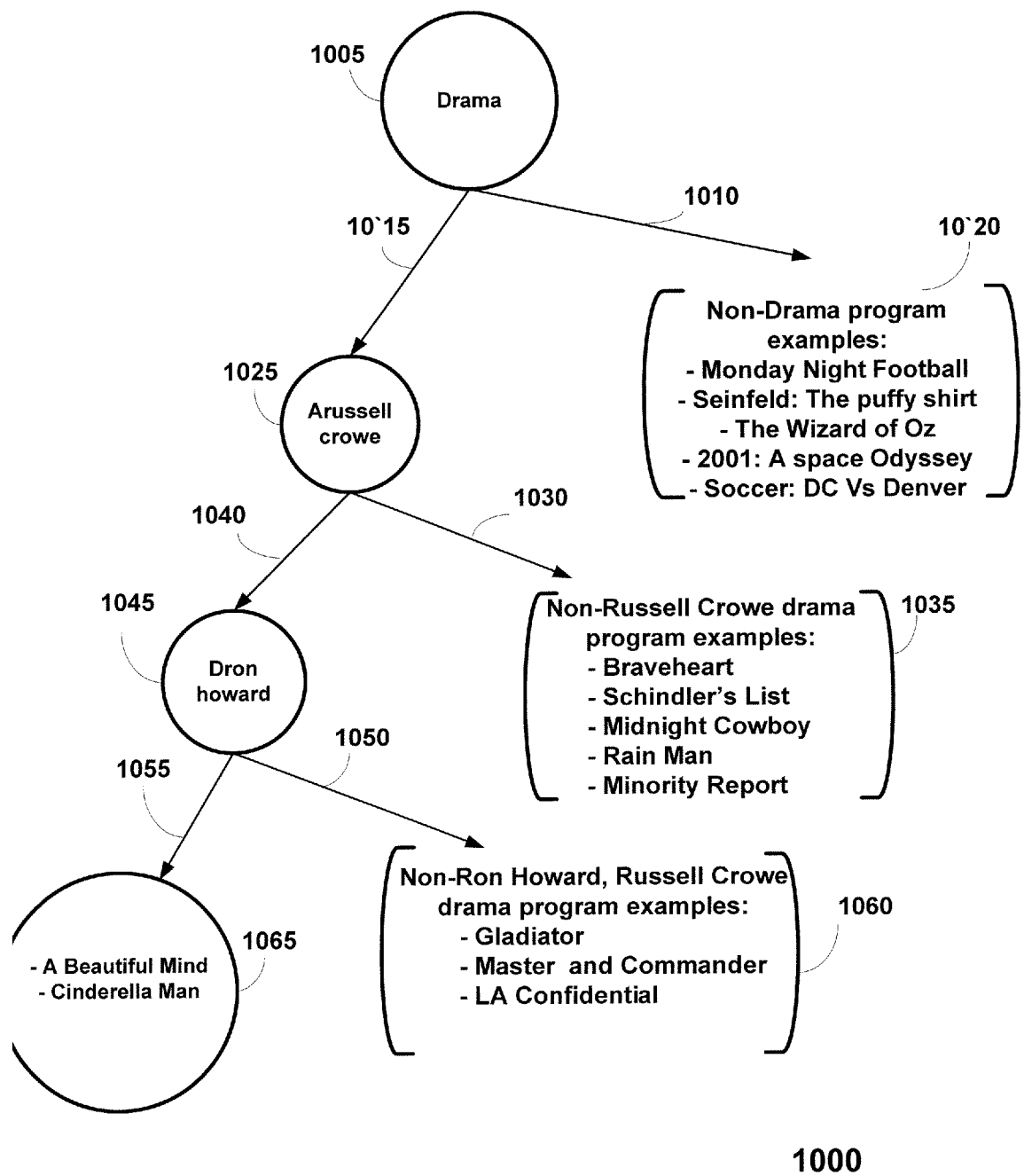
FIG. 10. is an illustration of an example binary decision tree according to an embodiment of the present invention.
Figure 11:
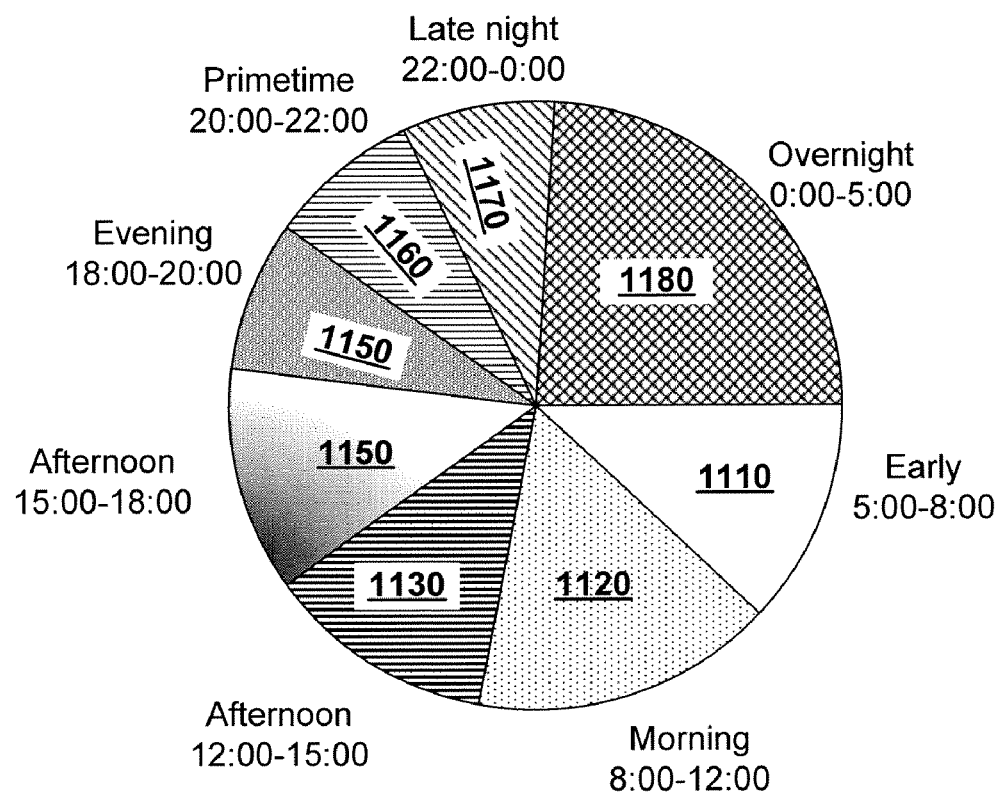
FIG. 11. is a pie-chart diagram illustrating television program scheduling blocks used to define certain attributes in an embodiment of the present invention.

An IPGX decision tree embodiment is shown in FIG. 10 showing a simple program example tree consisting of three nodes and four leafs for clustering program examples; in this case, the program examples of interest are drama with Russell Crowe as an actor, and Ron Howard as a director. The method of clustering program examples into appropriate leaves starts with 1005, where the method chooses 'drama' as a root node, and tests whether any newly received program example is a drama, or not. If it is a non-drama program example, the embodiment follows branch 1010 and the program example is placed in 1020, some of the non-drama example programs may be a Monday night football game, a Seinfeld episode, the movie the wizard of Oz, and others, but they will be further clustered and refined if and when more non-drama programming is learned. If the new program data is a drama, the embodiment follows branch 1015 to get to the next decision test for ascertaining if the program example has Russell Crowe as an actor, if not, branch 1030 is chosen, where all the non-Russell Crowe drama program examples are stored in leaf node 1035. But if the program example is a Russell Crowe drama, branch 1040 is chosen into node 1045, where the next test is performed to check whether Ron Howard is the director, if not, branch 1050 is chosen and into leaf node 1060. Branch 1055 is chosen into leaf node 1065 to find the program examples of interest, "A beautiful mind" and "Cinderella Man".

Additionally, program example vectors do not maintain their associated Program ID. In fact, examples having similar vectors are merged into single (archetypical) vectors in the interest of storage space and computing efficiency.

A clickstream algorithm 230 has been defined for using channel change information to quantify viewing preferences. This algorithm runs on the Client and sets the Relevance value for programs that have been viewed. Details of the algorithm are provided in Appendix A.

Programs with Relevance values exceeding a certain threshold are passed to the IPGX Learning engine embodiment to be learned as examples of "liked" programs.

While monitoring what viewers watch allows for some inference of dislikes or aversions, improvements are possible. (It is possible viewers simply didn't know what shows were available, or the viewer had to choose between various desirable programs aired at the same time.) Thus Relevance ratings are assigned in the range 0-255 where 0 represents ambivalence or no information available, 255 represents the strongest possible interest and values in between indicate progressively more "liking." As a result, the current decision tree clusters only programs presumably of interest (with some noise of course). Since a preferred purpose of the IPGX system is to identify the most desirable recommendations for viewers, it may be that negative examples could be ignored, but in other embodiments of the present invention, negative examples may have a certain value; as such, those negative examples are accommodated and retained by the embodiment described herein.

Attribute Bit Vectors are typically built on the Server using the fixed attributes defined in the Common Text Format. Attribute Bit Vectors may also be built on the client when necessary (e.g., source data comes from program guide information in the client). Term Bit Vectors are built on the Client using the BAF Term List and the set-top Term Table.

An exemplary process for building term vectors is:

1. Terms are identified, parsed, and preprocessed on the Server from program information sources, and then added to the Term Dictionary 220. The preprocessing varies depending on the class of the term as described in FIG. 7.

2. Relevant terms are added to the BAF describing each program and sent to the Client 220 where they are received by the Program Data Receiver 415.

3. Programs deemed "liked" by the Client are submitted to the IPGX Learning engine embodiment 440.

The Learning engine uses the BAF Term List and set-top Term Map to set Term Bit Vector bits as appropriate 240. New terms are added to the Term Map if they are judged significant enough.

Complete bit vectors (Attribute and Term segments) are incorporated into the IPGX Preferences Tree embodiment 250

Criteria for assigning a term a bit in the Term Map are:

A bit is available

Term has been seen in "liked" program BAFs more than N times (N currently=4)

Term count (frequency) is greater than M % of sum of all term frequencies (M currently=10%)

These thresholds make it easy for terms to initially be assigned bits and it becomes more difficult as more terms are seen.

Every time a term is seen in the BAF of a program being learned, its frequency count is incremented by 1. Terms seen for the first time are added to the Term Map and their frequency set to 1.

As Term Frequency counts reach the limit of the Term Frequency data type, all term frequencies in the list are reduced by half.

Typical elements of maintaining the Term Dictionary on the Server include:

Terms are pre-pended with the appropriate class identifier

Term frequencies across all available program descriptions are monitored and maintained for each term Terms having appropriate frequencies are assigned Term #s and included in the BAF Term Lists sent to the Clients; as noted in FIG. 7, frequency cutoffs vary by term class; up to 64 terms can be sent describing each program If more than 64 terms have been identified for describing a given program, a priority algorithm is used to determine which are sent The stop word list on the Server includes words judged to be not useful in characterizing programs. These provide an initial filtering out of high frequency words from the program description stream. Additional high frequency filtering is provided by the cutoffs determining what terms are included in BAFs.

Term stemming is accomplished in one embodiment using the Porter Stemmer.

IPGX embodiments typically build univariate binary trees as depicted in FIG. 9(*a*), FIG. 9(*b*), FIG. 9(*c*), and FIG. 9(*d*). Since training is unsupervised (examples are not classified as being in pre-defined classes, such as Programs of Interest or Programs Not of Interest), IPGX decision trees serve a clustering purpose.

New examples need not require a radically rebuild of the tree; it is possible to modify the tree to accommodate such new examples by allowing it to sprout new leafs as appropriate.

Only Bit Vectors for programs deemed to be of interest to the viewer are typically sent to the IPGX Learning engine embodiment for learning and thus incorporated in the tree.

The trees are built incrementally. Leaf nodes are split into two new leafs based on the following criteria:

Leaf contains N or more examples (e.g., N=2)

The difference between centroid values of the examples in the resulting clusters exceeds a certain threshold (e.g., 1.29999873/EXAMPLECOUNT)

To decide whether or not to split a leaf, each attribute is tried and centroid differences calculated until one is found that exceeds the threshold. If no split is found with a suitable metric, the leaf node remains as is.

Calculating the centroid of those program data sets may use, by way of non-limiting example:

$$\text{Similarity}(C_x, C_y) = S_{Cx,Cy} \equiv \frac{2\sum_{z=1}^{k}(a_{xz} \times a_{yz})}{\sum_{z=1}^{k} a_{xz}^2 + \sum_{z=1}^{k} a_{yz}^2}$$

Where Cx and Cy denote the two centroid vectors and the a's represent each attribute bit of the centroid vectors.

Since the program vectors are binary, this equation may be represented as, by way of non-limiting example:

$$S_{Cx,Cy} = \frac{2C}{A+B},$$

where
C=is the number of attributes shared by centroids $C_x$ and $C_y$.
A=is the number of 1 attributes in $C_x$
B=is the number of 1 attributes in $C_y$ Then, the split metric (SM) may be calculated as, by way of non-limiting example:

$$SM = (1 - S_{Cx,Cy}) \times \text{cluster\_density}$$

If SM>1.29999873/EXAMPLECOUNT, the node is split into the corresponding clusters. By way of non-limiting example:

$$C = \frac{1}{m}\sum_{i=1}^{m} d_j^i$$

Where,
C=is the centroid
$d_j^i$=is the i$^{th}$ number program description
m=is the number of examples When the number of examples in a leaf node reaches a maximum, e.g., 16, each new example is merged with an existing example (if one is found that is similar enough). Otherwise the new example replaces the oldest previous example. The current metric for merging examples is set for a similarity value between vectors that is >0.9 where similarity is measured by the Dice Coefficient.

The Dice Coefficient may be represented as, by way of non-limiting example:

$$\text{Similarity}(p_x, p_y) = S_{px,py} \equiv \frac{2\sum_{z=1}^{k}(a_{xz} \times a_{yz})}{\sum_{z=1}^{k} a_{xz}^2 + \sum_{z=1}^{k} a_{yz}^2}$$

Where px and py denote the two program vectors and the a's represent each attribute bit. Since the program vectors are binary, this equation reduces to, by way of non-limiting example:

$$S_{px,py} = \frac{2C}{A+B},$$

where
C=is the number of attributes shared by programs $p_x$ and $p_y$.
A=is the number of 1 attributes in $p_x$
B=is the number of 1 attributes in $p_y$ The following are typical characteristics of IPGX decision tree embodiments:
  They grow incrementally over time, starting with a small number of examples and are continuously modified as new examples come in
  They provide a concise summary of preferences over time to keep the data structures small (<~30 KB); information is constantly discarded; all examples eventually disappear by merging into summarized (archetypical) examples
  Clusters are thematic grouping of preferred program types
Ranking is accomplished by passing vectors representing new programs of potential viewer interest to the IPGX Ranking engine embodiment.

The vectors are prepared much like those for learned examples—the Server sets the fixed attributes and the Client sets the variable term bits based on the Term Map.

The Ranking engine navigates the tree to find the cluster best matching the example. A rank score is then calculated by blending the similarity between the submitted example and each example stored in the cluster with the associated Relevance values of each example in the cluster. The blending is the summation of the Dice coefficient times the Relevance value for the example summed over each example in the cluster. A K-factor is used to adjust for the relative importance of the two weighting schemes.

The engine returns a rank value for each example sent to it suitable for comparison against other examples. Thus a rank order of programs of potential interest can be provided for the viewer. The Client can send any collection of examples to be ranked, such as all programs available in some time window or all associated with particular genres. This will help constrain the ranking to what may be of particular interest at the time.

In summary, the IPGX embodiment described here extends Electronic Program Guides to allow program recommendations to be made to users based on their viewing history. To deliver this capability, certain IPGX embodiments leverage vector space model and inductive learning techniques.

These techniques allow certain IPGX embodiments to meet goals of: ease of use, ability to make good recommendations despite the presence of exceptions and dependencies, consistent with "edge computing," provides a ranking capability for new items, and protects user security and privacy.

Some ways in which IPGX embodiments may differ from other approaches include:
  Allows the assignment of rank scores to candidate programs so one can be recommended over another
  Decision trees are built incrementally using unsupervised learning to cluster examples into categories automatically
  Is consistent with "edge" (thick client) computing whereby certain data structures and most of the processing are localized to the set-top box rather than the MSO head end
  Is able to learn content attributes automatically, on-the-fly
  User preferences live on the set-top in opaque data structures and are not easily traceable to individual viewers Yet another embodiment of the present invention is implemented for example, in the arena of targeted advertising. A the goal is to be able to know as much as possible about the people watching TV at any instant, and to use that information to select advertisements that are most likely to resonate with them and interest them in a product. Certain embodiments of the present invention is configured to evaluate and assign an interest score to individual advertisement instances, and feed both an instance identifier and the interest score to a learning module. During the course of watching a television program, product advertisements interrupt the program, and a specific viewer may watch the presented advertisements for the duration of the commercial, part of the time or change the channel to a different channel. Therefore, the embodiment keeps track of all channel changes and other remote-control events made by the viewer, and evaluate those events to determine the level of interest that a user may display in a given program. In one embodiment, individual advertisements are given a unique identifier and an instance identifier, and relevance or score ranging from −127 to 127, signifying a total lack of interest in the advertisement when the score is −127, a neutral interest for a score of 0, and finally a total interest for a score of 127. The embodiment utilizes a formula for calculating the interest score, which may be represented as, by way of on-limiting example:

Interest score =
$$\left(\frac{\text{Time} \cdot \text{spent} \cdot \text{on} \cdot \text{a} \cdot \text{specific} \cdot \text{program}}{\text{Total} \cdot \text{time}}\right) \times \text{Highest} \cdot \text{relevance} \cdot \text{value}.$$

An example would be a 30 second advertisement for a product such as a specific automobile. If the viewer spends 20 seconds watching the advertisement, the interest score of that viewer for the product is 85 that translate to a strong interest. In such an event, the embodiment of the present invention utilizes the interest score, and transmits to a learning core that tailors individual advertisements of that specific automobile to the specific viewer.

Another embodiment employs a number of clustering decision trees, with each cluster representing a demographic of television viewers. From the remote control clickstream data, the embodiment ranks each of the clustering decision trees, accumulates ranking values of each decision tree, and infers the quantity and characteristics of the people who live in a specific household in relation to their age, and television viewing habits. The embodiment is implemented to discover the demographics of, for example, one household, and who is watching what program and at what times of the day on one set-top box. The embodiment pre-defines a number of clustering decision trees, each of which is associated with a demographic group of interest. From the remote control clickstream data, the embodiment ranks each of the clustering decision trees, accumulates ranking values of each decision tree, and infers the number of individuals and the characteristics of the people who watch television programming, their age and their television viewing habits. The demographic groups are then sorted according to the accumulated ranking values of each decision tree. As a result, the demographic group with the highest value may be represented by those watching television on that specific set-top box.

To identify the demographic group of the current dominant viewer, the embodiment performs the ranking, accumulation, and sorting for only the last 20 minutes of clickstream data. In another variation of the present invention, the algorithm constructs a 2-dimensional matrix indexed by both tree demographic, such as age and their television viewing habits, and a time value day-of-week/time-of-day at which the data is collected. This allows the demographic results to vary over time, giving more precise results of time-related viewing. For example, the set-top-box may be controlled by a family of two, the first one being a hard-riding biker father, and the other being his 3-year-old daughter. The combination of the primary method based on the identification of the two demographic groups, and a secondary method based on the time of day and the day of the week that a demographic group yields an idea of who is watching at any given time. As a result, this combination produces better historical patterns that may utilized in constructing individual targeted advertising for different demographic groups of a single household. Another method identifies branches of the clustering decision tree associated with individual viewers, calculates a centroid of each cluster as well as a centroid of all the clusters. When the centroid of all clusters in one branch is significantly different than that of another branch, associate each branch with a distinct viewer, thereby resulting in a similarity of one cluster for one viewer being higher than another cluster generated by the viewing habits of another viewer.

Yet another embodiment of the present invention compares the clustering decision trees generated by different applications, and/or on different set-top-boxes (if there are more than one set-top box) in the house to generate more information about the viewers in the household. The embodiment compares the trees and branches of those trees for similarities and differences using a similarity algorithm defined earlier. Differences indicate another viewer who prefers one TV over another. Similarities at different times indicate a viewer who watches different televisions at different times. This may allow us to identify different television sets for the family, the kids, the bedroom, etc.

Similarities at overlapping times indicate multiple viewers in the house with the same interests and demographics. Subtle differences between these similar trees/branches/clusters may define subtle distinctions between similar individuals.

To bid on on-line auction items, bidders may log onto one of the many auction web sites, register by entering their basic personal information about themselves, credit card information (if any), and e-mail addresses for payment processing and communication purposes respectively. In addition, bidders are usually required to submit a username and password for allowing them to log onto the auction web site. Then bidders then search categories to find things about items to bid on, and when they find an item of interest, bidders usually select that item, enter their registered username and password and the bid amount if the current bid is the minimum, otherwise, a bidder would place a bid that is higher than the current high bid, which is displayed along with the description of the item. In the event that the bidder is the highest bidder or has been out-bid by another one, he or she is notified by e-mail. As such, an automated embodiment for organizing a bidder's pattern of items and the ability for bidder's to receive information about items of interest is needed.

Another embodiment employs a number of clustering decision trees to recommend on-line auction items for individual bidders. The bid item information about a currently selected item that a bidder is bidding on, information such as type of an item such as for example, a wristwatch, a digital camera, a laptop computer, etc., age of an item, size, and other characteristics is collected by the embodiment of the present invention, transformed into a binary vector, and the vector is assigned a relevance value. The relevance value ranges from zero to 255, 127 positive values, 127 negative values and one zero value. The positive values represent a positive interest; zero value represents a neutral interest, and a total lack of interest on the part of the bidder for items with negative values. Based on the relevance value accorded to the auction item data, the embodiment of the present invention passes interest scores to a learning engine that utilizes a binary decision tree constructed from the term bit vectors associated with the auction item data that has the highest relevance values. Along with the number of times that a bidder inquired about an item, an example of a bidder's preference is presented to the learning algorithm that incrementally updates the learned preferences of the bidder. The embodiment of the present invention employs a binary decision tree to store learned information from the sequence of examples, maintains the set of examples which are grouped into clusters that were already determined to have matching attributes of an on-line bid item. The embodiment periodically collects bid items from a multiple on-line auction web sites, and when new examples related to a given item is identified, the embodiment applies a similarity configuration in order to find an existing leaf node of the binary decision tree where each new example related to a bid item should reside. In order to rank the examples in the cluster, the embodiment employs a similarity algorithm based on other examples in the cluster. Another step of arbitrating between attributes associated with items of interest and items of disinterest, the embodiment calculates the level of interest using certainty factors that suggests a prior probability represents a measure of belief (MB) for positive examples, and a measure of disbelief (MD) for negative examples. After the auction items are given a certainty factor value, then the embodiment of the present invention groups the items using a similarity algorithm, and concludes which of the examples to keep on a leaf node of the decision tree, and which ones to discard or merge with others. Based on the certainty factors value accorded to an on-line auction item, and the examples in the leaf nodes of the binary decision tree, the embodiment creates individual preferences based on the learned process to recommend to a specific user.

In another embodiment of the present invention, the algorithms are configured for a data filtering application, such as filtering e-mail spam. In this exemplary embodiment, all processing takes place on the client (e.g., PC or set-top box) after e-mails are received from an e-mail server. Items are e-mail messages rather than video program descriptions. Fixed attributes include bits for representing information such as, by way of non-limiting example:

SCHED_ (multiple bits characterizing day and time e-mail was sent)
SIZE_ (multiple bits characterizing size of e-mail, e.g., SHORT, MED, LONG)
URGENT (is e-mail marked Urgent?)
ADDRESSEE_ME (is e-mail addressed to me?)
SENDER_SAME_DOMAIN (is sender in the same domain as me?)
REPLYTO_SAME (is Reply-To address same as sender's address?)
ATTACHMENTS (were there any attachments?)

Variable terms are parsed from the To, From, and Subject fields and the Body of the e-mails and represented as:

T<to address> (e.g., Tme@mydomain.net)

F<from address> (e.g., Fjoespammer@satanslair.org)

R<reply address> (e.g., Rtimesharesrus@offshore.com)

S<subject term> (e.g., Spoignant, Scodfish)

B<body term> (e.g., Bcondo, Btimeshare, Brolex, Bdeal)

These terms are encoded and maintained in a Term Dictionary (hash table) on the client and used to assign term bits based on term frequency.

With reference to FIG. 2, an exemplary process for filtering e-mails is as follows:

In step 220, item descriptions are generated by client processes by receiving e-mails from an e-mail server, extracting attributes and terms from the e-mails, and maintaining extracted terms in a local Term Dictionary (hash table).

Then, items to be filtered (e.g., those e-mails considered spam) are learned 230. In a spam filtering application this would likely be accomplished by the user clicking a "This is SPAM" button.

In the next step 240, the Learning engine 440 is configured to learn the variable terms listed above based on the number of times it encounters those terms in e-mails of interest and, when a threshold is reached, it adds the term to the Term Bit Vector. Once this step is done, a complete bit vector representing the e-mail is ready to be learned by the decision tree.

In step 250, the system clusters the e-mail examples for comparison against future incoming e-mails using the binary decision tree. E-mails designated both SPAM and NOT SPAM are learned by the tree to allow appropriate discrimination during spam filtering.

Finally in step 260, new e-mails are processed into Bit Vectors and passed to the Ranking engine 435 to assess their potential interest to the recipient. Using the Preferences Tree, a candidate e-mail is filtered into the cluster containing the most similar examples where it is determined if the e-mail is spam or not. E-mails classified as spam are routed to a special storage area for future inspection by the user and/or for deletion.

It will be apparent to those skilled in the art that there are many variations that may be made in the embodiments of the invention as described above without departing from the spirit and scope of the invention. There are, for example, different ways that one might apply a variety of known methods for selecting statistically significant terms to accomplish the purposes described in the invention. Such differences do not necessarily constitute distinguishable variations because it is well known that the same results in function, hence method of application, may well be accomplished by a variety of code and/or system arrangements. There are similarly many other variations that will be apparent to those with skill in the art, all within the spirit and scope of the invention.

Appendix A

Exemplary IPGX Architecture

IPGX embodiments are generally complex technologies with many pieces. Core learning and ranking algorithms constitute much novel technology, but they represent only a small fraction of the code. An extensive support system on both server and client sides is generally required to supply the algorithms with program information in a useable format. This document outlines the various modules that are typically required to make an IPGX embodiment, and the basic requirements for their operation.

External Software Application

IPGX may be include embedded technology. It is intended to be used, for example, as an extension to existing IPG and PVR products. Thus, the IPGX client will typically be embedded within another, external software application. As such, IPGX may present a simple, clean interface to that external software.

Programs and Program Instances

Every movie, series episode, sporting event, or other program is a unique element of video content or program. However, that same program may be aired on different dates, at different times, or on different channels; such airings of a program defining a program instance. Every program may have many instances, but each program instance only refers to one program.

Segments

Although a small percentage of programming may begin at odd times, the majority of programming starts and ends on half-hour boundaries. IPGX embodiments typically deal with programming in half-hour increments or program segments. Within our database we will create information for each half-hour segment of a program. Thus, a two-hour movie would produce 4 segments of information in the database. And a programming day is divided into 48 such segments. The IPGX server will typically broadcast the information at all times for all programs in the current segment and for some number of future segments.

Program and Instance Identifiers

Every program description will ultimately be defined by a vector of bits and other sundry information (see below). However, many modules will merely keep track of or communicate references to programs or program instances. For example, a PVR may keep track of all programs that have been viewed so that they are not recorded more than once. Or an IPG may want to rank program instances, because a program that may be highly ranked on Saturday morning may not be ranked the same late Saturday night. Thus, IPGX embodiment typically define an unambiguous mechanism for producing small, unique identifiers for all programs and instances. IPGX embodiments can learn and rank program instances—the time of airing is significant.

Note that VOD and other on-demand programming (e.g., BlockBuster rentals) do not have specific air dates and times. However, the catalog of available programming transmitted to the IPGX client should include ALL programming available in a given segment, including VOD, pay-per-view, etc.

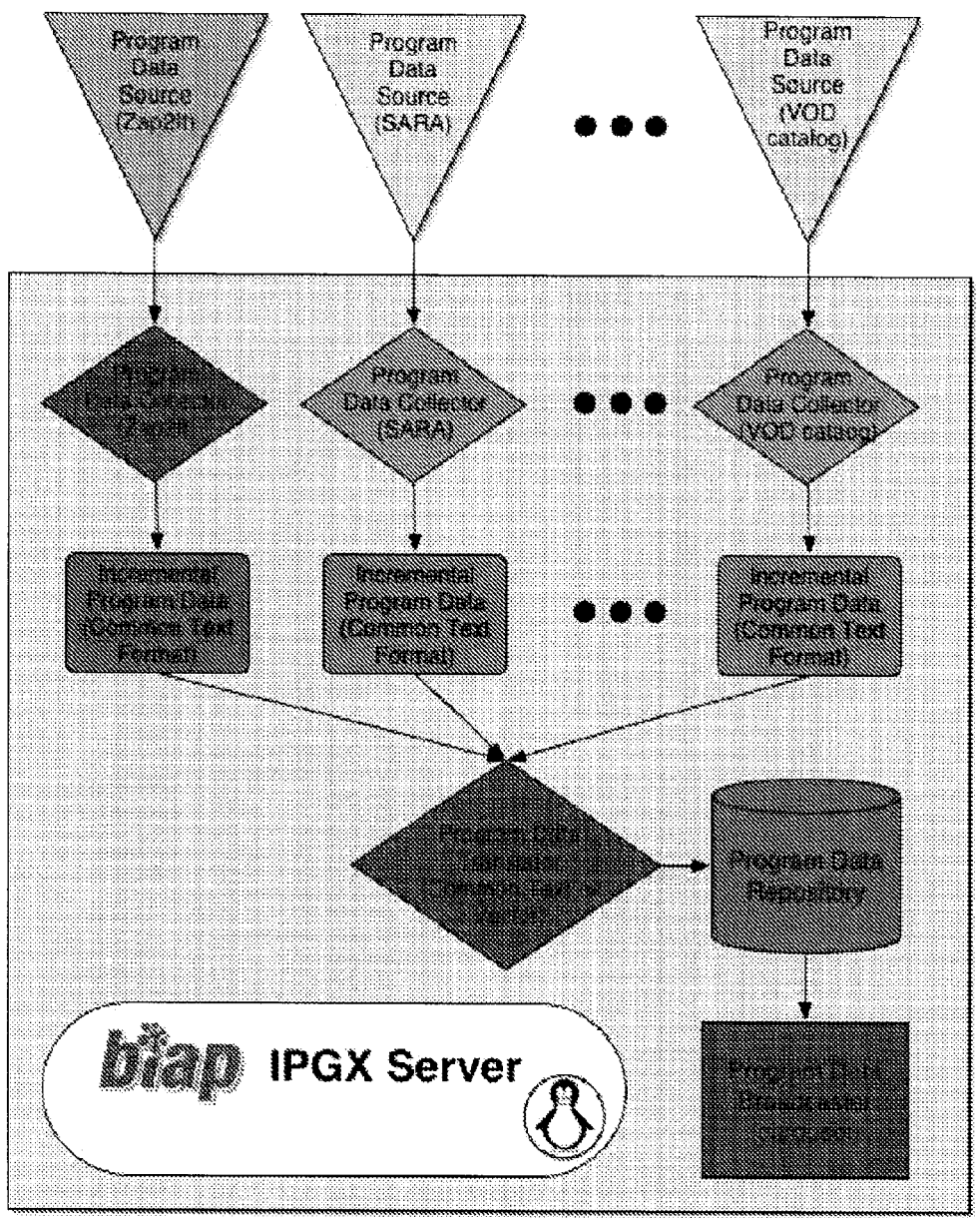

IPGX Server

A purpose of the IPGX server is to retrieve program information from one or more sources (e.g., Zap2It, Yahoo, SARA, VOD Catalog, etc.) and convert it into the vector form expected by IPGX algorithm embodiments on the set-top-box (STB). Unique identifiers are typically defined for each program and instance. The various components are illustrated and described below.

Program Data Collectors

Program information may come from a variety of sources, and the sources may vary depending on IPGX customer or application of the technology. Therefore, we separate the process of collection of information from the process of translating that information into attribute format. It is thus the job of a collector to retrieve program information in whatever format it exists, and using whatever communication mechanisms are appropriate for the data source, and to convert that information into a common text format. This common text format maps all field names to a canonical set of names that encompasses all potential programming types (e.g., sports, movies, series, news, etc.).

Though the diagram shows the data being output by collectors, it may be simply passed on as it is produced to translator for addition to the database.

It is the responsibility of the collector to ensure that information for all program instances is retrieved and processed. It is also the responsibility of the collector to insure that no duplicate program instances are processed.

The first fields of any program instance information are the program and instance identifiers. These identifiers are short and unique, yet comprehend enough program information to ensure that repeated airings of the same program will be assigned the same program identifier. The instance identifier is typically constructible by external software without access to any internal IPGX information. For program identifiers we recommend a small digest (i.e., MD5, SHA1) string is constructed from program title, episode # (if any), episode name (if any), year of production, date of production (if available), etc. For instance identifiers, simple representations should be used for channel number, date, and time for broadcast programming.

On-demand (e.g., VOD) or external programming (e.g., BlockBuster rentals) presents something of a problem. Their program information will not change over time, though they are available in all segments. Thus the collectors for this information should assign special constants (e.g., VOD, RENTAL, etc.) to the instance identifiers of these programs so they appear in the repository (see below) only once. It will then be the responsibility of the broadcaster (see below) to generate specific instances for each such program in each segment.

Program Data Translator

The program data translator translates program descriptions from common text format into a much compressed attribute format. Most attributes of a program description (e.g., channel, production year, genre, sub-genre, etc.) whose values can be defined as a fixed range will be translated into a vector of binary values. Other, free text terms (e.g., title, description, cast, director, etc.) will be processed as in information retrieval, by performing stemming (reducing words to roots), removing common stop words (e.g., the, and, of, etc.), and then storing them in a dictionary/database along with their frequency. Lower frequency terms tend to represent more information and will be assigned a global numeric identifier, common across all of IPGX. People names (i.e., cast, director, writer, producer, etc.) and other terms will be handled similarly, though without stemming or stopping. Terms appearing in a program description will then have their corresponding identifiers attached to the binary vector to describe the program. The binary vector and set of associated term identifiers constitutes the attribute format of a program description.

The attribute format descriptions will be stored in the repository. These program descriptions will contain all attributes corresponding to the canonical list of fields described above for the common text data format.

Program Data Repository

The repository is simply a robust database running on Linux. Reliability and programmability are more important than performance. The repository typically contains two types of records: program information (in attribute format) and term mappings (numerical IDs assigned to terms). Program information will be input by the translator and read by the broadcaster. Term mappings will be read and modified by the translator only.

Program Data Broadcaster

The broadcaster is responsible for maintaining the contents of an inband carousel containing all program information for the current and future segments. At this time the actual carousel is not specified. It may be the SA BFS or some other custom BIAP carousel.

At any time, programs available to all subscribers (including VOD programming and any external programming) are typically defined in the carousel for the current and some number of future segments. Thus, for the on-demand programming the broadcaster typically finds all program descriptions with the constant instance identifiers (e.g. VOD, RENTAL) as defined above, and generate the appropriate instance identifiers and airing date and time related attribute bits in the program descriptions.

IPGX Server Implementation

Although the above architecture does not specify an overall platform or implementation strategy, for technical reasons a solution based on BIAP Platform technology is preferred. Agents or scheduled scripts, possibly supported by plug-ins, could play the role of collectors. Another plug-in could perform translations from common programming information format into attribute format. And yet another scheduled process could act as broadcaster, gathering all program information for a given segment and inserting it into the carousel. An appropriate database (e.g., MySQL) and inband carousel may be used.

IPGX Client

The IPGX client is typically an embedded software module that ranks individual program instances on a fixed scale (e.g., 0 to 255) based on the likelihood that the viewer will want to watch the program defined by the program instance. The only other interface exposed to the external application is a call to produce instance and program identifiers from information available to a conventional IPG or PVR (e.g., channel & time, or description, etc.).

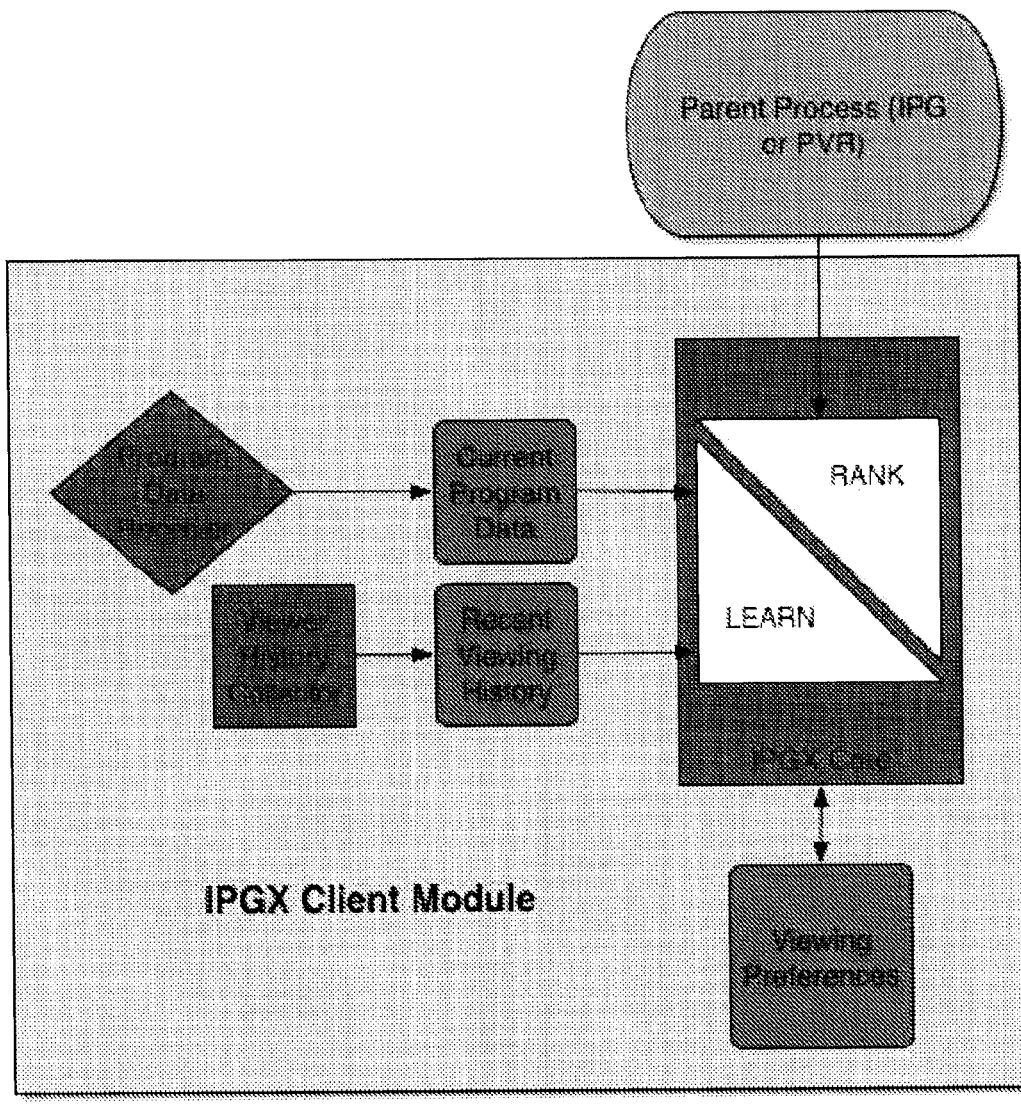

Program Data Receiver

The program data receiver is the client side counterpart of the broadcaster, periodically retrieving new program information from the inband carousel and replacing older information in the local cache. It may also be necessary to communicate directly with the server to retrieve program information for specific program instances on-demand (i.e., those in the far future or the past that are not in the cache).

The receiver typically operates on a scheduled basis, retrieving information for a new future segment every half hour. It is also typically capable of responding to requests to minimize memory, and re-fill the cache as needed.

Viewer History Collector

This module is responsible for logging a viewer's viewing history, evaluating it to assign an interest score to individual program instances, and feeding both the instance identifier and score to the learning interface of the IPGX core. The preferred implementation of this module is to use clickstream analysis to infer the viewer's interests.

During the course of watching a movie, a viewer may flip channels during commercials, or may even skip some or the entire movie. Thus, this collector typically keeps track of all channel changes and other remote-control events made by the viewer, and later evaluate them to determine how much interest the user displayed in a given program.

The following rules define a simple clickstream algorithm that can be used to assign an interest score to a given program instance.

1. Viewing information should only be logged and evaluated while the STB is on and actively generating output for the TV.
2. Interest scores will range from 0 to 255, with 0 indicating no or unknown interest in a program, 255 indicating absolute positive interest in the program, and intermediate values indicating an increasing level of interest. Programs with the highest interest scores should be submitted to the Learning engine.
3. For programs of which at least 10% is viewed, the percentage of overall time spent viewing the program will be used to indicate the level of interest. For example, spending 100 minutes watching a 120 minute movie results in an interest score of (100/120)*255=213 (with rounding).
4. The period of time without any remote control activity is assumed to be inversely proportional to the chance that the viewer has left the room with the STB on. IF the channel changes during the viewing of a program AND returns to the program, do not modify the interest score from (3) above—human is present and watching the program. Otherwise, reduce the interest score (see #3 above) by twice the number of minutes since the last remote control event prior to the start of the program. For example, consider another 120 minute movie that is viewed on channel 45. After 100 minutes the viewer tunes to channel 98 but does not tune back to channel 45 during the remainder of the movie. It is then possible that the TV was just left unattended on channel 45, and when the viewer returned to the room he switched it to something he wanted to watch—not the movie. Further, assume in this case that prior to the start of the movie, the last logged remote control event was 62 minutes old. We would thus assign a raw score of 213 to the movie, but then reduce that score by 2*62, for a total score of 89. Note, if the adjusted score is zero or negative, the program instance is not sent to the IPGX core for learning.

This module could be supplemented by other modules that help identify programs of interest to the viewer. Functions preferably included at this point in the system are the ability to identify programs of interest and assign appropriate interest scores.

IPGX Core

IPGX core embodiments typically implement the learning and ranking algorithms, and are typically provided as a C language module with two simple interfaces:

void Learn (instance_id id, char interest_score);

interest_score Rank (instance_id id);

The preferences learned from the various instances are stored in an opaque structure of fixed size. This structure will generally be loaded from the server on startup and saved to the server periodically, and on shutdown.

Appendix B

Exemplary IPGX Attributes and Data Formats

Introduction

As described in the Architecture document, program data fed to a typical IPGX embodiment comes from a variety of sources. But regardless of the source or original format, all data will generally be converted into a canonical text format. This canonical text format will then be processed to produce the binary data format required by the IPGX learning and ranking algorithms. This section defines the canonical text format (CTF) and the mapping into the binary attribute format (BAF).

This section is not intended to limit the fields in the CTF or BAF to those defined here. This merely constitutes an initial definition. New content types and new sources will expand these definitions as appropriate.

Canonical Text Format (CTF)

This section describes a canonical text format and describes the conversions implemented for source data. Examples may refer to the Zap2it™ Data Direct XTVD Schema Definition, Version 1.3. Although the actual format may be XML, MIME or some other standard text format, this document will abstract the actual text representation to focus on the field names and values. The actual surrounding syntax is assumed.

Program Description

Many fields are intrinsic to the description of program content, and in no way refer to when or where a program is made available to the viewer. These are defined below.

Program Identifier

This is typically a unique identifier for this program. Because no single source will provide IDs for all of the potential program types a new scheme is being defined. Note, this is different than the program instance identifier (see below).

Program Episode Identifier

For series, mini-series, etc., several programs may have the same title and hence the same program identifier. Another unique identifier identifies episodes within a program (i.e., series). Most series simply number the episodes. Typically, the identifiers are unique within the episodes of a given program. Distributor-defined episode numbers (e.g., Zap2it's syndicatedEpisodeNumber) are preferred to episode ids created by the listing companies.

Program Title

This is the "short" title associated with a given program. Movie titles, series titles, and sporting event titles would appear here. More specific information (e.g., episode titles, team matchups, etc.) will appear in the program subtitle. Examples include:

Gone With the Wind

Seinfeld

Wide World of Sports

The Wonderful World of Disney

NFL Football

XXXIII Olympics

Program Subtitle

This field augments the program title. Episode titles—when available—go here, as do team matchups, or specific sporting even descriptions.

Examples (related to the above titles) include:

The Puffy Shirt

Cycling

The Marlin Perkins Rampage

Washington Redskins vs. Dallas Cowboys

Program Description

This is a free-form text field describing program content. Whenever possible, cast and crew names (often in parentheses) should be removed from the description, along with extraneous punctuation (i.e., the parentheses). When the source provides multiple descriptions of varying length and depth, a preferable length is about two sentences long. It is also preferable to avoid those that are too short or too long. For example, "Jerry's new girlfriend convinces him to wear a pirate shirt for his next appearance on the Tonight Show. Kramer joins the IceCapades" is preferred to "Jerry wears pirate shirt" or to a multi-paragraph synopsis of the episode.

Program Age Rating

There are multiple rating systems available to assign programs to appropriate age groups. We prefer a smaller more concise system, similar to the old movie ratings. That is: G, PG, R, X, NR. The following table maps MPAA and TV ratings into these values:

| IPGX RATING | MPAA RATING(S) | TV RATING(S) |
| --- | --- | --- |
| G | G, PG | TV-Y, TV-Y7, TV-G |
| PG | PG-13 | TV-PG, TV-14 |
| R | R | TV-MA |
| X | NC-17, AO | |
| NR | NR | <not-rated> |

Program Quality Rating

There are multiple rating systems available to denote a critical rating of program quality. Again, we prefer a simple system as follows: BAD, FAIR, GOOD, EXCELLENT, UNRATED. The following table maps several rating systems into these values:

| IPGX RATING | 3 STAR RATING(S) | 5 STAR RATING(S) | METACRITIC PERCENTAGE |
| --- | --- | --- | --- |
| BAD | $0 \geq X > 1$ stars | $0 \geq X > 1.5$ stars | $0 \geq X > 30\%$ |
| FAIR | $1 \geq X > 2$ stars | $1.5 \geq X > 3$ stars | $30 \geq X > 60\%$ |
| GOOD | $2 \geq X > 3$ stars | $3 \geq X > 4.5$ stars | $60 \geq X > 85\%$ |
| EXCELLENT | 3 stars | $4.5 \geq X > 5$ stars | $85 \geq X > 100\%$ |
| UNRATED | <not-rated> | <not-rated> | <not-rated> |

Program Runtime

IPGX embodiments typically measure time in half-hour segments. Divide the total number of minutes by 30, and add 1 for any non-zero fractions. For example, 5 minutes, 28 minutes, and 30 minute runtimes all convert to 1 segment. 31 minutes, 35 minutes, 59 minutes and 60 minutes all convert to 2 segments. And so on . . . .

Program Year

Movies and series and some other programs are listed with a year of production. In a typical IPGX embodiment, we want to map these years to a smaller set of values: OLD (pre 1970), DATED (1970-1989), MODERN (90-last year), CURRENT (this year). Any program for which the production year is unknown or unavailable is assumed to be CURRENT.

Program Color

This field designates the Color or Black & White format of a program. Although there are many possible combinations (e.g., The Wizard of Oz is part B&W), anything that is at all "color" will be designated as COLOR. Otherwise, pure B&W programs will be designated as BLACK AND WHITE. Colorized B&W programs are COLOR.

Program Advisories

Several categories of parental advisories are supported in IPGX embodiments. This field may contain zero or more entries from the following list:

NUDITY—From brief to extensive

SEX—Strong sexual content beyond nudity and language

VIOLENCE—From mild to graphic

LANGUAGE—From mild to graphic

Many advisories support additional categories, but these should be mapped into this set as appropriate. For example, "rape" maps to SEX and VIOLENCE.

Program Cast, Writer, Director, Producer

Although information on a variety of people involved with a program may be available, IPGX typically limits interest to the main cast, writer(s), director(s) and producer(s). Fields for each should contain zero or more names in the following format: SURNAME, GIVENNAME (all uppercase, surname first, comma separated). For example, the fields for Star Wars might be:

PROGRAM PRODUCER: LUCAS, GEORGE

PROGRAM DIRECTOR: KASDAN, LAWRENCE

PROGRAM WRITER: LUCAS, GEORGE; WRITER, GHOST

PROGRAM CAST: HAMMIL, MARK; FORD, HARRISON; GUINESS, ALEC; FISHER, CARRIE

Program Type

Program type describes the format of the program, not its content, and is not to be confused with genre. Valid program types include:

SERIES—Any repeating or episodic program (e.g., Friends, Celebrity Poker)

SPECIAL—Any one-time program not in another category (e.g., the Oscars)

PAID—Infomercials or other paid programs.

SPORTS—Sporting events, but not sports-related series

MOVIE—Any single movie or stand-alone fictional program

NEWS—News broadcasts, weather channel broadcasts, etc.

TALK—Talk shows, interviews (e.g., Daily Show, Letterman, Crossfire, Charlie Rose, Sunday with Wolf Blitzer, Larry King)

OTHER—Types not covered above

Program Genre

Genre applies primarily to programs of type SERIES, SPECIAL or MOVIE, and describes the general content type and style of a program. As such, it preferably balances the need for high discrimination with the preference for a small value set. Genre information should be mapped to the following value set (more than one value may apply for a program):

DRAMA

ACTION

WESTERN

SCI-FI/FANTASY

COMEDY

MUSICAL

MYSTERY

THRILLER

ADVENTURE

HORROR

ROMANCE

FAMILY

ANIMATION

CHILDREN

OTHER

Some programs will be appropriately listed as belonging to many genres. Others may only have one. For example, Kill Bill (vol. 1) could be ACTION, COMEDY, THRILLER, MYSTERY, ANIMATION, but Star Wars might be simply SCI-FI/FANTASY. Other descriptors apply to the program subgenre field (e.g., football, soap opera, politics). If relevance information is provided in the genre listings, only include those above some logical threshold.

Program Subgenre

This field is a free-for-all. Any terms that describe the program should appear here in all caps, comma delimited. This includes the sport-type for program type SPORTS (e.g., FOOTBALL, BASKETBALL), or types of talk shows (e.g., BUSINESS/FINANCIAL), or even further descriptions of genre (e.g., KUNG-FU for a program of type MOVIE and genre ACTION). If relevance information is provided, only include subgenres above some logical threshold.

Program Instance Description

Program instance fields describe the circumstances in which a program is broadcast to the user, but in no way describe the content of the program. With respect to IPGX, typically only the time, day and channel-related fields have any relevance.

Instance Air Day

This is the day of the week on which the specific program instance is airing. Values are MONDAY thru SUNDAY.

Instance Air Time

This is the time of day in which the program instance begins to air. All times are rounded down into the half-hour segment in which they occur. IPGX embodiments typically map all airtimes into one of the following values:

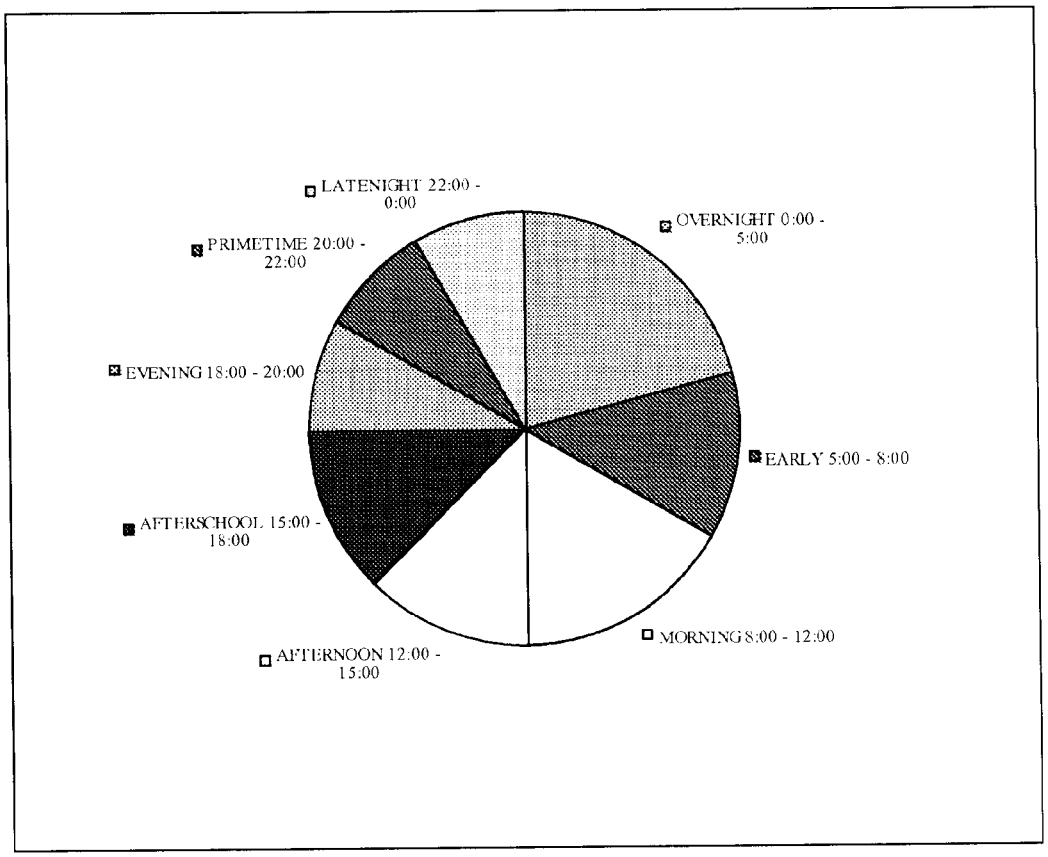

Instance Channel Name

This field uniquely identifies the channel. It could be represented as the channel name or callsign associated with a given channel in the channel map within a market. For example, HBO, ESPN, WXYZ. On demand or pay-per-view content should contain the channel name of the service on which it is launched (e.g., HOD for HBO on Demand, or PPV1 for the first pay-per-view channel). For any other on-demand content that is not associated with a channel, use the names VOD or PPV as appropriate. Multiple names may apply to a given station, and should be listed comma-separated. For example, the local ABC affiliate might have an instance channel name of: ABC, WJLA. One implementation uses a unique 5-digit code prepended by the letter C.

Instance Cost

This defines the immediate cost to the user of a given program. For most broadcast or cable content this is $0.00. Only PPV or VOD will likely have a non-zero cost associated with it.

Binary Attribute Format (BAF)

A basic memory layout of a program definition in BAF is presented in the table below. This exemplary layout contains all information that is stored for a program instance in this embodiment.

| Name | First Byte Index | Length (bytes) | Description |
|---|---|---|---|
| Program Identifier | 0 | 8 | Unique identifier of program |
| Instance Identifier Addendum | 8 | 8 | Additional information that when combined with program identifier, uniquely identifies program instance. |
| Relevance | 16 | 1 | Integer (0 . . . 255) quantifying user's interest in this program. |
| Attribute BitVector | 17 | 8 | The individual attribute bits associated with the fields in the CTF. |
| Term BitVector | 25 | 8 | Individual attribute bits mapped to terms found in various CTF fields. |
| Term Count | 33 | 1 | The number (N) of relevant term indices in the term list to follow (max 64). |
| Term List | 34 | 128 | The list of N 2-byte term indices most relevant to this program instance. |

This particular embodiment requires a total of 162 bytes to store an entire program instance description. However, most actual consumers of this information will only want to see a subset of this information. For example:

| Information Consumer | Information Needed |
|---|---|
| External Software | Program Instance ID, Program ID |
| IPGX Learning | Attribute BitVector, Term BitVector, Relevance |
| IPGX Ranking | Attribute BitVector, Term BitVector |

-continued

| Information Consumer | Information Needed |
|---|---|
| IPGX Client | Attribute BitVector, Term BitVector, Term Count, Term |

| Information Consumer | Information Needed |
|---|---|
| | List |

Program and Instance Identifiers

Definition and internal format of program and instance identifiers is implementation dependent.

Attribute Bitvector Mapping

Many attribute fields in the CTF can be conveniently mapped to one or more bits within the attribute bitvector. For some of these fields individual field values map directly to the state of an attribute bit. However, other fields are more complicated. The general rules of thumb are:

Use as few bits as possible to denote all values of interest

Make each bit meaningful all by itself

Make each combination of bits based on the same CTF field meaningful.

For example, notice in the table below that rather than allocating seven bits for the days of the week, we only use two. Each bit is associated with a meaningful grouping of days (e.g., week days or school nights). These are the most pertinent groupings for TV watching. And in combination they allow you to specify four day groupings (00=Saturday, 01=Sunday, 10=Friday, and 11=Monday . . . Thursday).

Notice that the first 6 bits are devoted to program instance information, and the next 58 to program content.

| Bit # | Instance Attribute | Mapping from CTF |
|---|---|---|
| 0 | weekday | INSTANCE AIR DAY in {MONDAY . . . FRIDAY} |
| 1 | schoolnight | INSTANCE AIR DAY in {SUNDAY . . . THURSDAY} |
| 2 | daytime | INSTANCE AIR TIME in {MORNING . . . AFTERSCHOOL} |
| 3 | afterschool | INSTANCE AIR TIME in {AFTERNOON . . . EVENING} |
| 4 | primetime | INSTANCE AIR TIME in {EVENING . . . LATENIGHT} |
| 5 | latenight | INSTANCE AIR TIME in {LATENIGHT . . . OVERNIGHT} |
| 6 | free | INSTANCE COST == $0.00 |
| 7 | expensive | INSTANCE COST >= $5.00 |

| Bit # | Program Attribute | Mapping from CTF |
|---|---|---|
| 8 | short | PROGRAM RUNTIME in {1, 2} |
| 9 | medium | PROGRAM RUNTIME in {2, 3} |
| 10 | long | PROGRAM RUNTIME >= 3 |
| 11 | kids | PROGRAM AGE RATING in {G, PG} |
| 12 | teens | PROGRAM AGE RATING in {PG, R} |
| 13 | adult | PROGRAM AGE RATING in {R, X} |

-continued

| Bit # | Program Attribute | Mapping from CTF |
|---|---|---|
| 14 | stinks | PROGRAM QUALITY RATING in {BAD, FAIR} |
| 15 | watchable | PROGRAM QUALITY RATING in {FAIR, GOOD} |
| 16 | wonderful | PROGRAM QUALITY RATING in {GOOD, EXCELLENT} |
| 17 | color | PROGRAM COLOR == COLOR |
| 18 | old | PROGRAM YEAR == OLD |
| 19 | dated | PROGRAM YEAR == DATED |
| 20 | modern | PROGRAM YEAR == MODERN |
| 21 | current | PROGRAM YEAR == CURRENT |
| 22 | nudity | PROGRAM ADVISORY contains NUDITY |
| 23 | sex | PROGRAM ADVISORY contains SEX |
| 24 | violence | PROGRAM ADVISORY contains VIOLENCE |
| 25 | language | PROGRAM ADVISORY contains LANGUAGE |
| 26 | series | PROGRAM TYPE == SERIES |
| 27 | special | PROGRAM TYPE == SPECIAL |
| 28 | sports | PROGRAM TYPE == SPORTS |
| 29 | movie | PROGRAM TYPE == MOVIE |
| 30 | news | PROGRAM TYPE == NEWS |
| 31 | talk | PROGRAM TYPE == TALK |
| 32 | paid | PROGRAM TYPE == PAID |
| 33 | othertype | PROGRAM TYPE == OTHER |
| 34 | drama | PROGRAM GENRE contains DRAMA |
| 35 | action | PROGRAM GENRE contains ACTION |
| 36 | western | PROGRAM GENRE contains WESTERN |
| 37 | scifi | PROGRAM GENRE contains SCI-FI/FANTASY |
| 38 | comedy | PROGRAM GENRE contains COMEDY |
| 39 | musical | PROGRAM GENRE contains MUSICAL |
| 40 | mystery | PROGRAM GENRE contains MYSTERY |
| 41 | thriller | PROGRAM GENRE contains THRILLER |
| 42 | adventure | PROGRAM GENRE contains ADVENTURE |
| 43 | horror | PROGRAM GENRE contains HORROR |
| 44 | romance | PROGRAM GENRE contains ROMANCE |
| 45 | family | PROGRAM GENRE contains FAMILY |
| 46 | animation | PROGRAM GENRE contains ANIMATION |
| 47 | children | PROGRAM GENRE contains CHILDREN |
| 48 | othergenre | PROGRAM GENRE contains OTHER |
| 49 . . . 63 | reserved | Reserved for future use |

Term BitVector Mapping

The remaining fields in the CTF format all produce terms that may be used to rank a program or instance. But because the learning/ranking algorithms only understand bitvectors these terms are typically assigned to one of the 64 bits in the terms bitvector to be useful. This section describes how terms are assigned to bits in the vector.

1. Each term is preferably stemmed appropriately for its type. For example, words in the program title or description (not including cast names) are reduced to their roots (e.g., talking→talk, goes→go, readable→read, etc.). Everything is converted to all upper (or lower) case and punctuation removed. Source code for versions of this process are widely available. The Porter stemmer, available here, is recommended: http://filebox.vt.edu:8080/users/yucui/IR.code/ir-code/stemmer/)

2. Common words that contribute no significant information should be removed. An initial list of such "stop words" is found at: http://filebox.vt.edu:8080/users/yucui/IR.code/ir-code/stopper/. Additional words commonly found in TV descriptions will be added.

3. Every CTF field that contributes a term is typically associated with a unique character, as in the table below. This character is generally prepended to the term. For example, Danny DeVito would be Ddanny devito if he appears as a director or Adanny devito if he appears as an actor in the cast.

| Unique Prefix | CTF Field |
|---|---|
| T | PROGRAM TITLE |
| S | PROGRAM SUBTITLE |
|   | PROGRAM DESCRIPTION |
| A | PROGRAM CAST |
| W | PROGRAM WRITER |
| D | PROGRAM DIRECTOR |
| P | PROGRAM PRODUCER |
| G | PROGRAM SUBGENRE |
| C | INSTANCE CHANNEL NAME |

4. On the server side, all resulting terms are generally stored in a database along with a unique, 2-byte index and a count of the number of their occurrences.

5. The indices of the 64 (preferably fewer) terms that appear in a program description and carry the most information should be included in the BAF program description. Terms that occur too frequently or too seldom tend to bear little information. Those that occur in the middle carry the most information.

6. On the client side, an embodiment of the IPGX core will maintain a mapping of term indices into term attribute bits and will perform the mapping of terms to bits.

CONTACT INFORMATION

Any inquiry concerning this communication or earlier communications from the examiner should be directed to DONALD LAWSON whose telephone number is (571)270-3429. The examiner can normally be reached on Monday Friday, 7:30 am to 5:00 pm EST.

If attempts to reach the examiner by telephone are unsuccessful, the examiner's supervisor, John Breene can be reached on (571) 272-4107. The fax phone number for the organization where this application or proceeding is assigned is 571-273-8300.

The invention claimed is:
1. A method for recommending items to a user, the method comprising:
  using an electronic processor to retrieve item descriptions from one or more data sources;
  transforming the item descriptions into a binary attribute format comprised of an attribute bit vector and one or more term numbers, wherein the attribute bit vector comprises a fixed set of attributes describing the item and the term numbers comprise a variable set of attributes describing the item;
  converting the item descriptions from the binary attribute format into a bit vector, wherein the bit vector comprises the information contained in the attribute bit vector and a term bit vector which comprises a subset of the information defined by the term numbers as determined by a term mapping process;

identifying items of interest to a user by monitoring user actions;

learning to recognize items of interest to a user by employing one or more machine learning techniques, wherein the bit vectors representing the items of interest serve as input to the machine learning technique; and recommending one or more items from a set of items based on ranking scores calculated by comparing the bit vectors of the one or more items with relevance values of similar items as determined and encoded by the machine learning technique.

2. The method of claim 1, wherein items include television programs, movies, advertisements, music, books, merchandise, online auction-items, sports players, sports teams, e-mail messages, vendors, service providers, businesses, advertisers, web sites, video clips, pictures, or text content.

3. The method of claim 1, wherein the item descriptions are television program listings, interactive program guide entries, web pages, database entries, text documents, or reviews.

4. The method of claim 1, wherein the data sources are web sites, online databases, private databases, printed item descriptions, or electronic files.

5. The method of claim 1, wherein retrieval is one of accessing a file over a communications network, accessing a local file on a local hard drive, or manual entry of descriptive information.

6. The method of claim 1, wherein the transforming of the item descriptions into a binary attribute format included an intermediate step of converting the item descriptions into a canonical format.

7. The method of claim 1, wherein the term mapping process comprises:

maintaining a term map table for a user, wherein the frequency of terms found in the binary attribute format of item descriptions that correspond to items of interest to said user are maintained;

mapping terms that meet frequency criteria to bits in the term map table; and using term attributes corresponding to mapped terms in subsequent term bit vectors for said user.

8. The method of claim 1, wherein a machine learning technique further comprises:

the incremental construction and maintenance of a clustering decision tree from item description bit vectors corresponding to items of interest to said user.

9. The method of claim 8, wherein the data storage requirements of the clustering decision tree are constrained for low-memory environments such as CPE devices.

10. The method of claim 9, wherein similar item description bit vectors stored in a leaf of said clustering decision tree are merged.

11. The method of claim 9, wherein chronologically older item description bit vectors stored in a leaf of said clustering decision tree are deleted to make room for new item description bit vectors.

12. The method of claim 1, wherein certain steps of the method are performed on one or more server computers, while the remaining steps are performed on client CPE devices, said server computers and said CPE devices connected by a communications network.

13. The method of claim 10, wherein items are television programs and movies, and the communications network is a broadband television network.

14. The method of claim 11, wherein the broadband television network is a digital cable television network.

15. The method of claim 11, wherein the broadband television network is a digital satellite television network.

16. The method of claim 11, wherein the broadband television network is an IPTV television network.

17. The method of claim 1, wherein user actions are composed of clickstream data.

18. The method of claim 15, wherein the said user's interest in an item is quantified by a relevance score computed from said clickstream data.

19. The method of claim 16, wherein said relevance score is calculated using:

$$\text{Relevance Value} = \left(\frac{\text{Time Spent on a specific program}}{\text{Total Time}}\right) \times \text{Maximum Relevance Value}.$$

20. The method of claim 8, wherein multiple clustering decision trees are used to distinguish between multiple users.

21. The method of claim 8, wherein the clustering decision trees from multiple CPE devices are compared to distinguish between multiple users, and to derive usage patterns of said users.

22. The method of claim 1, wherein the items are e-mail messages, and the application of the recommendation method is to identify SPAM e-mail.

23. A system for recommending items to a user, the system comprising:

one or more electronic processors configured to:

retrieve item descriptions from one or more data sources;

transform the item descriptions into a binary attribute format comprised of an attribute bit vector and one or more term numbers, wherein the attribute bit vector comprises a fixed set of attributes describing the item and the term numbers comprise a variable set of attributes describing the item;

convert the item descriptions from the binary attribute format into a bit vector, wherein the bit vector comprises the information contained in the attribute bit vector and a term bit vector which comprises a subset of the information defined by the term number as determined by a term mapping process;

identify items of interest to a user by monitoring user actions;

learn to recognize items of interest to a user employing one or more machine learning techniques, wherein the bit vectors representing the items of interest serve as input to the machine learning technique; and recommend one or more items from a set of items based on ranking scores calculated by comparing the bit vectors of the one or more items with relevance values of similar items as determined and encoded by the machine learning technique.

24. The system of claim 23, wherein the items include television programs, movies, advertisements, music, books, merchandise, online auction-items, sports players, sports teams, e-mail messages, vendors, service providers, businesses, advertisers, web sites, video clips, pictures, or text content.

25. The system of claim 23, wherein the item descriptions are television program listings, interactive program guide entries, web pages, database entries, text documents, or reviews.

26. The system of claim 23, wherein the data sources are web sites, online databases, private databases, printed item descriptions, or electronic files.

27. The system of claim 23, wherein retrieval is one of accessing a file over a communications network, accessing a local file on a local hard drive, or manual entry of descriptive information.

28. The system of claim 23, wherein the transforming of the item descriptions into a binary attribute format included an intermediate step of converting the item descriptions into a canonical format.

29. The system of claim 23, wherein the term mapping process comprises: maintaining a term map table for a user, wherein the frequency of terms found in the binary attribute format of item descriptions that correspond to items of interest to said user are maintained; mapping terms that meet frequency criteria to bits in the term map table; and using term attributes corresponding to mapped terms in subsequent term bit vectors for said user.

30. The system of claim 23, wherein the machine learning technique further comprises: the incremental construction and maintenance of a clustering decision tree from item description bit vectors corresponding to items of interest to said user.

31. The system of claim 30, wherein the data storage requirements of the clustering decision tree are constrained for low-memory environments such as CPE devices.

32. The system of claim 31, wherein similar item description bit vectors stored in a leaf of said clustering decision tree are merged.

33. The system of claim 31, wherein chronologically older item description bit vectors stored in a leaf of said clustering decision tree are deleted to make room for new item description bit vectors.

34. The system of claim 23, wherein certain steps of the system are performed on one or more server computers, while the remaining steps are performed on client CPE devices, said server computers and said CPE devices connected by a communications network.

35. The system of claim 32, wherein items are television programs and movies, and the communications network is a broadband television network.

36. The system of claim 35, wherein the broadband television network is a digital cable television network.

37. The system of claim 35, wherein the broadband television network is a digital satellite television network.

38. The system of claim 35, wherein the broadband television network is an IPTV television network.

39. The system of claim 23, wherein user actions are composed of clickstream data.

40. The system of claim 39, wherein the said user's interest in an item is quantified by a relevance score computed from said clickstream data.

41. The system of claim 40, wherein said relevance score is calculated using:

$$\text{Relevance Value} = \left(\frac{\text{Time Spent on a specific program}}{\text{Total Time}}\right) \times \text{Maximum Relevance Value}.$$

42. The system of claim 30, wherein multiple clustering decision trees are used to distinguish between multiple users.

43. The system of claim 30, wherein the clustering decision trees from multiple CPE devices are compared to distinguish between multiple users, and to derive usage patterns of said users.

44. The system of claim 23, wherein the items are e-mail messages, and the application of the recommendation is to identify SPAM e-mail.

* * * * *